United States Patent [19]

Omae et al.

[11] Patent Number: 5,570,215
[45] Date of Patent: Oct. 29, 1996

[54] LIQUID CRYSTAL DISPLAY APPARATUS AND PROJECTION DISPLAYING APPARATUS HAVING A ROTATABLE PHASE DIFFERENCE PLATE AND POLARIZER

[75] Inventors: Hideki Omae, Suita; Yoshito Miyatake; Hiroshi Takahara, both of Neyagawa, all of Japan

[73] Assignee: Matsushita Electric Industrial Co., Ltd., Osaka-fu, Japan

[21] Appl. No.: 510,872

[22] Filed: Aug. 3, 1995

Related U.S. Application Data

[63] Continuation of Ser. No. 148,511, Nov. 8, 1993, abandoned.

[30] Foreign Application Priority Data

Nov. 9, 1992 [JP] Japan .................................. 4-298321

[51] Int. Cl.[6] .............................................. G02F 1/1335
[52] U.S. Cl. .................................... 359/73; 359/41
[58] Field of Search .................................... 359/73, 41, 40

[56] References Cited

U.S. PATENT DOCUMENTS

| | | | |
|---|---|---|---|
| 4,427,888 | 1/1984 | Galvin | 250/331 |
| 4,984,874 | 1/1991 | Yamamoto et al. | 350/334 |
| 5,018,839 | 5/1991 | Yamamoto et al. | 350/347 R |
| 5,061,042 | 10/1991 | Nakamura et al. | 359/63 |
| 5,157,523 | 10/1992 | Yamagishi et al. | 359/41 |
| 5,157,529 | 10/1992 | Koopman et al. | 359/73 |
| 5,166,817 | 11/1992 | Ota et al. | 359/73 |
| 5,179,457 | 1/1993 | Hirataka et al. | 359/73 |
| 5,196,953 | 3/1993 | Yeh et al. | 359/73 |
| 5,245,451 | 9/1993 | Wu et al. | 359/55 |
| 5,388,907 | 2/1995 | Aoyama et al. | 374/130 |

FOREIGN PATENT DOCUMENTS

| | | | |
|---|---|---|---|
| 60-26322 | 2/1985 | Japan . | |
| 61-186937 | 8/1986 | Japan . | |
| 1-173012 | 7/1989 | Japan . | |
| 2-000023 | 1/1990 | Japan | 359/73 |
| 2-176628 | 7/1990 | Japan . | |
| 3-228016 | 10/1991 | Japan | 359/73 |

Primary Examiner—William L. Sikes
Assistant Examiner—Charles Miller
Attorney, Agent, or Firm—Wenderoth, Lind & Ponack

[57] ABSTRACT

A liquid crystal displaying apparatus, a projection displaying apparatus, and a view finder apparatus using the liquid crystal displaying apparatus, are disclosed. Polarizing plates are disposed on the incident side and the outgoing side of a liquid crystal cell so that a twisted nematic liquid crystal is arranged to become approximately 90° in twist angle between two transparent substrates having a picture element electrode. A direction of a phase advancing axis of the phase difference plate with respect to the polarized light axis of the polarizing plate on the incident side is set so that the transmission index of the optical head from the polarizing plate on the incident side to the polarizing plate on the outgoing side may become minimum when a given voltage for black displaying operation is applied on the liquid crystal cell and the light is inputted from the given direction.

44 Claims, 20 Drawing Sheets

LIQUID CRYSTAL DISPLAY APPARATUS AND PROJECTION DISPLAYING APPARATUS HAVING A ROTATABLE PHASE DIFFERENCE PLATE AND POLARIZER

This application is a Continuation of now abandoned application, Ser. No. 08/148,511, filed on Nov. 8, 1993.

BACKGROUND OF THE INVENTION

The present invention generally relates to a liquid crystal displaying apparatus for effecting an image displaying operation and a projection displaying apparatus using it, and a view finder apparatus.

In order to obtain larger picture face images, a method is known of forming optical images corresponding to image signals on a light valve, irradiating light to the optical images, and effecting an enlarged projecting operation on a screen by a projection lens. Lately, a projection displaying apparatus using a liquid crystal panel as a light valve has been used. Although there are many types of liquid crystal panels, twisted nematic (TN) liquid crystals are used as liquid crystals so as to obtain high picture quality of projecting images. A thin film transistor element (TFT) provided on each picture element is generally used as a switching element.

Basic construction of projection display apparatus using a TN liquid crystal panel is shown in FIG. 18. An outgoing light from a light source 11 is inputted into a projection lens 15 after being transmitted through a TN liquid crystal panel 14. The TN liquid crystal panel 14 forms optical images as changes in transmission index in accordance with image signals. Optical images formed on the TN liquid crystal panel 14 are enlarged and projected onto a screen 16 by the projection lens 15.

The TN liquid crystal panel 14 is composed of a liquid crystal cell 20 with a TN liquid crystal 19 being charged between two substrates 17 and 18, and two polarizing plates 21 and 22 to be arranged on both sides thereof. A picture element electrode, a TFT, a gate wire and a source signal wire are formed on one substratum 18. An opposite electrode is formed on the other substrate 17. A black matrix for shielding the light is formed on the TFT, the gate wire and the source signal wire. Alignment films are formed respectively on the picture element electrode and the opposite electrode, and crystal molecular long axis of the TN liquid crystal 19 becomes twisted by 90° by the rubbing processing of the alignment film. A polarized light axis of the polarizing plate 21 on the incident side is parallel or perpendicular to a long axis direction of the liquid crystal molecule which is in contact with a substratum 18 on the incident side. The polarized light axes of the two polarizing plates 21, 22 are parallel or perpendicular. A system arranged for making two polarized light axes parallel to each other is said to be in a normally black (NB) mode. A system arranged for making two polarized light axes orthogonal with respect to each other is said to be in a normally white (NW) mode. In a projection displaying apparatus, the NW mode is often used. In the NB mode, chromaticity changes are caused to be near black display, which is too conspicuous. Such a problem does not occur in the NW mode. In the NW mode, the chromaticity changes are caused to be near the white display, which is not too conspicuous.

An operation of the TN liquid crystal panel in the NW mode will be described hereinafter. When natural light is inputted into the polarizing plate 21 on the incident side, linearly polarized light is outputted, and the linearly polarized light is inputted into the liquid crystal cell 20. When a voltage is not applied to the liquid crystal layer 19, the polarization wave face of the linearly polarized light is rotated by 90° by the liquid crystal layer 19 so that it passes through the polarizing plate 22 on the outgoing side so as to effect a white displaying operation. When sufficient voltage is applied to the liquid crystal layer 19, rotation of the light by the liquid crystal layer 19 is removed. As the light passes through the liquid crystal layer 19 without the rotation of the polarization face of the linearly polarized light, it does not pass through the polarizing plate 22 on the outgoing side, so as to effect a black displaying operation.

The TN liquid crystal panel 14 can form optical images as changes in transmission index by controlling the applied voltage. When the TN liquid crystal panel is used as a light valve, the image display of a larger picture face can be effected if the picture face size of the liquid crystal panel is smaller.

Recently, in order to use the brightness and resolution of the projected image, three liquid crystal panels have been mainly used for red, green, and blue colors, respectively. A front system where a projector and a screen are separated from each other (for example, Japanese Patent Laid-Open Publication No. 62-133424), and a rear system where a transmission type of screen is mounted in the front portion of a cabinet and all the optical components are accommodated within the cabinet (for example, U.S. Pat. No. 5,042,929) have been proposed. Both the systems have received public attention because they have resulted in more compact arrangements.

Components of the optical head of the front system are shown in FIG. 19. Light coming from a light source 31 is inputted into a chrominance resolution optical head composed of dichroic mirrors 32, 33 and a flat mirror 34 and are resolved into lights of the three (red, green and blue) primary colors. The primary color lights are respectively transmitted through field lenses 35, 36 and 37, and thereafter, are inputted into liquid crystal panels 38, 39 and 40. Optical images are formed on the liquid crystal panels 38, 39 and 40 as changes in transmission index in accordance with image signals. Outgoing lights from the liquid crystal panels 38, 39 and 40 are composed into one light by a chrominance composition optical head composed of dichroic mirrors 41, 42 and a flat mirror 43. The composed light is inputted into a projection lens 44. Optical images on three liquid crystal panels 38, 39 and 40 are enlarged, and projected onto a screen by a projection lens 44.

Components of an optical head of the rear system are shown in FIG. 20. A transmission type screen 52 is disposed in the upper portion on the front side of a cabinet 51. A projector is disposed in a rear lower position. A flat mirror 54 is disposed in a forward lower position. A flat mirror 55 is disposed rearwardly of the screen 52. A projection distance (light path length from a projection lens to the center of the screen) is shortened and the projector can be made smaller in size so that the cabinet 51 can be made more compact. The screen 52 is composed of a flannel lens combined with a renticular plate.

The projector is composed of a light source 56, a liquid crystal panel 57 and a projection lens 58. Lights coming from the light source 56 are bent in direction by a mirror 53 after passing through the liquid crystal panel 57 and are inputted into the projection lens 58. Optical lights as changes in the transmission index are formed on the liquid crystal panel 57 in accordance with the image signals. The optical images on the liquid crystal panel 57 are enlarged, and are projected onto the screen 52 by the projection lens 58.

The relationship between a transmission index T and an incident angle θ when a maximum driving voltage is applied upon the TN crystal liquid panel of the NW mode so as to make parallel lights incident is shown in FIG. 21. The transmission index T becomes minimum when an incident angle θ is a certain angle θo. Assume that an incident angle θo where the transmission index becomes minimum is called an optimum incident angle. θo≠0. A transmission index at θ=θo is smaller than a transmission index at θ=0°. Normally when a liquid crystal layer thickness of the liquid crystal panel is 4 through 5 μm, and an applied voltage is 5 through 6 V, an optimum incident angle θo is 3° through 5°. It is better for the contrast of the display images to make light incident from a slightly oblique direction, instead of making the lights incident perpendicular to the liquid crystal cell.

A projection displaying apparatus using the fact that lights incident obliquely to the liquid crystal panel are better in contrast has been proposed (for example, Japanese Patent Laid-Open Publication No. 63-73782 and Japanese Patent Laid-Open Publication No. 3-71110). The components of this example are shown in FIG. 22. Although the liquid crystal layer 19 is perpendicular to the optical axis 61 of the projection lens 15, the picture center 62 of the liquid crystal panel 14 is deviated from the optical axis 61 of the projection lens 15. The optical axis of the light source 11 is also made parallel to the optical axis 61 so that an angle, made by a straight line for connecting the picture face center 62 of the liquid crystal panel 14 with the eye center 63 of the projection lens 15, and the optical axis 61 of the projection lens 15, may be at an optimum incident angle. In the construction shown in FIG. 22, contrast in the picture center is better than that for the construction shown in FIG. 18.

A projection display of a construction shown in FIG. 22 is required to make the maximum picture angle of the projection lens larger as compared with the construction shown in FIG. 18. The illumination intensity of an area far from the projection lens among the projection images becomes lower. This fact becomes conspicuous as the maximum picture angle of the projection lens of the basic construction shown in FIG. 18 becomes larger. It becomes an especially serious problem in the rear system. The maximum picture angle of the projection lens 58 is required to be much larger so as to make the lights incident obliquely to the liquid crystal panel 57 for improvement in the contrast in the construction shown in, for example, FIG. 20. Thus, the intensity of illumination in an area far from the projection lens 58 on the screen 52 becomes considerably lower as compared with the illumination intensity at the center of the picture. If the surrounding illumination intensity ratio is made larger, the projection lens 58 will become larger and longer, and it will be difficult to make the cabinet 51 compact.

It has been considered to raise a driving voltage to be applied upon the liquid crystal layer to 10 V or more as a method of improving the contrast of the projection image. This method requires that the power voltage of a drive IC be raised. The temperature of the liquid crystal panel will therefore be raised so as to increase the generation of caloric value (heat) of the drive IC, and thus the picture quality of the display images will be undesirably degraded.

A view finder using a CRT was mounted on the conventional video camera. A video camera which is smaller in size and lighter in weight is desired. Therefore, a view finder using a TN liquid crystal panel was used. However, the contrast of the display images was inferior. The cause is the same as in the projection display apparatus using a liquid crystal panel. Although the contrast is better when the display image of the liquid crystal panel is seen from the oblique direction, it is hard for a user to see.

As described hereinabove, a liquid crystal displaying apparatus where the display images become higher in contrast can be realized when the lights are inputted at a perpendicular incidence.

SUMMARY OF THE INVENTION

Accordingly, an essential object of the present invention is to provide a projection display apparatus better in contrast, and a view finder apparatus.

Another important object of the present invention is to provide a liquid crystal displaying apparatus superior in contrast when lights are perpendicularly inputted to realize such a projection displaying apparatus.

In accomplishing these and other objects, according to one preferred embodiment of the present invention, there is provided a liquid crystal displaying apparatus which comprises a liquid crystal cell arranged so that a twisted nematic liquid crystal may become approximately 90° in twist angle between two transparent substrata having a picture element electrode, a polarizing plate on the incident side to be disposed on the incident side of the above described liquid crystal cell, a polarizing plate on the outgoing side to be disposed on the outgoing side of the above described liquid crystal cell, a phase difference means to be disposed between the above described polarizing plate on the incident side and the above described liquid crystal cell or between the above described liquid crystal cell and the above described polarizing plate on the outgoing side. A polarized light axis of the above described polarizing plate on the incident side is approximately parallel or approximately perpendicular to a molecular long axis of a liquid crystal molecule which comes into contact with the above described transparent substrate on the incident side. The polarized light axis of the above described polarizing plate on the incident side is approximately orthogonal to the polarized light axis of the above described polarizing plate on the outgoing side. A direction of a phase advancing axis of the above described phase difference means with respect to the polarized light axis of the above described polarizing plate on the incident side is set so that the transmission index of the optical head from the above described polarizing plate on the incident side to the polarized light plate on the outgoing side may become minimum when a given voltage for a black displaying operation is applied on the above described liquid crystal cell and the lights are inputted from the given direction.

A liquid crystal molecule which comes into contact with the transparent substratum on the incident side is desired to be directed in a picture horizontal direction or a picture vertical direction.

A phase difference means provided to effect a retardation of 5 nm or more, or 50 nm or lower for light of 540 nm in wavelength. The phase difference means can use a transparent resin film. The phase difference means can use a film or a plate using either of vinylriden fluoride, triacetate, diacetate, cellophane, polyether sulfon, polyether ketone, polysulfone, polycarbonate, polyester, polyvinyl alcohol, saran, polyallylate. The phase difference means may be formed with a plurality of the above described films or plates pasted thereon.

The phase difference means may be separated from the liquid crystal cell, the polarizing plate on the incident side and the polarizing plate on the outgoing side so as to vary the direction of the phase advancing axis. The phase difference means may be optically combined by a transparent body on either of the adjacent polarizing plate and the liquid crystal cell or on both of them. The transparent body in this case is an elastic material or liquid. The phase difference means is desired to be rotatable within the given angle range with respect to the element on the opposite side to be combined with the above transparent body. Gel like transparent silicone resin may be used as a transparent body. The phase difference means is divided into a plurality of areas. The retardation from the given wavelength for each area or the direction of the phase advancing axis may be different.

A projection displaying apparatus of the present embodiment is provided with a light source, a liquid crystal displaying apparatus for inputting the light of output from the above described light source and for forming an optical image in accordance with image signals, and a projection lens for inputting the outgoing light from the above described liquid crystal displaying apparatus and projecting the above described optical images onto a screen. The above described liquid crystal displaying apparatus is used as the liquid crystal displaying apparatus.

Another projection displaying apparatus of the present invention comprises a light source for radiating light including chrominance components of three primary colors, a chrominance resolving means for resolving the irradiation light of the above described light source into three primary color lights, three liquid crystal displaying apparatus for respectively inputting three output lights of the above described color resolving means and forming optical images in accordance with the image signals, a light composing means for composing the outgoing light of the above described three liquid crystal displaying apparatus, a projection lens for inputting the outgoing light from the above described light composing means and projecting the above described optical images onto the screen. The above described liquid crystal displaying apparatus is used as the liquid crystal displaying apparatus.

Still another projection displaying apparatus of the present invention comprises a cabinet, a transmission type screen to be disposed on the front side of the above described cabinet, a light source, a liquid crystal displaying apparatus for forming optical images in accordance with the image signals by the incident operation of the outgoing light of the above described light source, and a projection lens for projecting the above described optical images onto the above described screen by the incident operation of the outgoing light of the above described liquid crystal displaying apparatus. The liquid crystal displaying apparatus comprises the above described liquid crystal displaying apparatus, with all the elements being accommodated within the above described cabinet.

The projection lens to be used for each of the above described projection displaying apparatuses is effective to cause all the major lights which become incident into the above described projection lens from each picture element of the liquid crystal displaying apparatus to be made approximately parallel to one another.

A view finder apparatus of the present invention comprises a light source, a liquid crystal displaying apparatus for forming optical images in accordance with the image signals by the incident operation of the outgoing light of the above described light source, and an eye lens for converting the above described optical images into enlarged virtual images by the incident operation of the outgoing light of the above described liquid crystal displaying apparatus. The above described liquid crystal displaying apparatus is used as the liquid crystal displaying apparatus.

BRIEF DESCRIPTION OF THE DRAWINGS

These and other objects and features of the present invention will become apparent from the following description of the preferred embodiments thereof with reference to the accompanying drawings, in which.

DETAILED DESCRIPTION OF THE INVENTION

Figure 1:
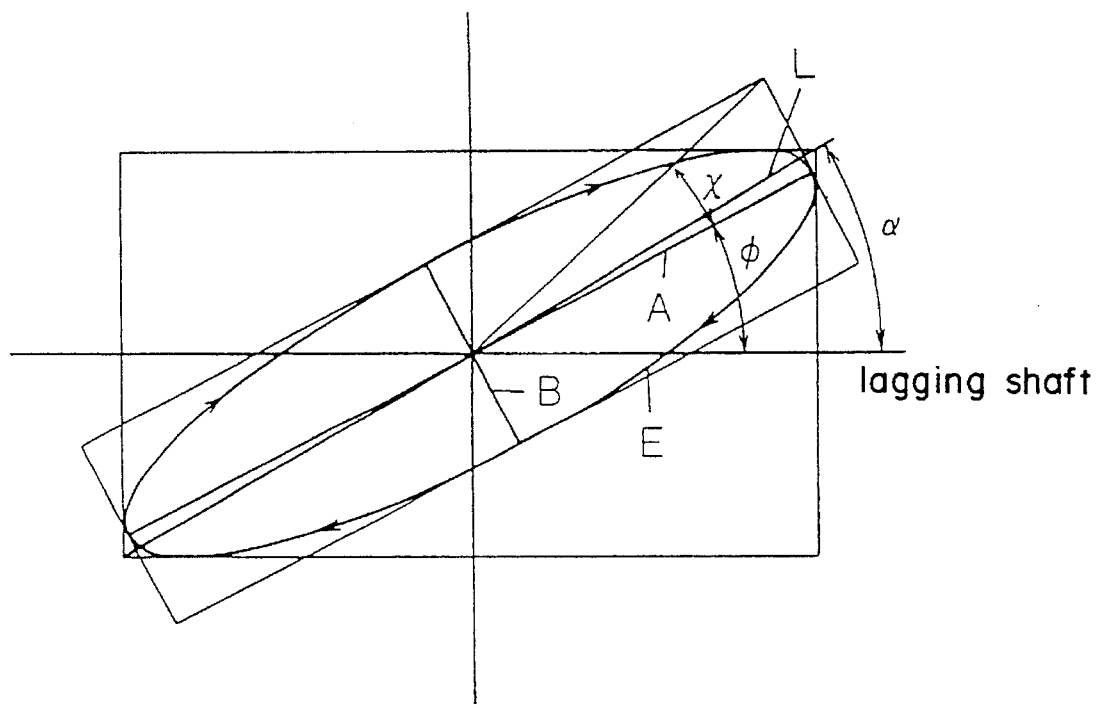
FIG. 1 is a schematic diagram for illustrating an operation of a phase difference plate.

Before the description of the present invention proceeds, it is to be noted that like parts are designated by like reference numerals throughout the accompanying drawings.

Operation of the present invention will be described hereinafter.

A case of the black display will be described hereinafter. Assume that light which is incident to the liquid crystal displaying apparatus is natural light which is superior in parallel degree of single wavelength. When the natural light is inputted into the polarizing plate on the incident side, only linearly polarized light is outputted and then inputted into the liquid crystal cell. Although the liquid crystal molecules near the center of the liquid crystal layer rise almost perpendicular to the substrate when the given driving voltage is applied upon the liquid crystal cell, the liquid crystal molecule near the substrate surface does not rise completely because of the intensity of the mutual function with respect to the substrate. Since slight double refraction exists in the liquid crystal cell, the outgoing light of the liquid crystal cell becomes ovally polarized. The elliptically polarized light is very small in elliptical index and the elliptical long axis is almost parallel to the polarized light axis of the polarizing plate on the incident side. Since the elliptically polarized light functions to effect a linearly polarized light operation when certain conditions are composed in the phase difference plate, the elliptically polarized light outgoing from the liquid crystal cell can be converted into the linearly polarized light. The plane of polarization of the linearly polarized light is made perpendicular to the polarized light axis of the polarizing plate on the outgoing side, and the intensity of the light outgoing from the polarizing plate on the outgoing side becomes very small and causes a black displaying operation. The intensity of the outgoing light is smaller than in a case where a phase difference plate does not exist. A transmission index in the black display of the liquid crystal displaying apparatus becomes considerably smaller than in a case where a phase difference plate is not used.

An elliptically polarized light which is outputted from the liquid crystal cell is small in elliptical index, and the phase difference plate may be made very small in retardation. Since an angle between the elliptical long axis of the incident elliptically polarized light and a polarization direction of the outgoing linearly polarized lights is very small when the retardation is small, an angle between a polarized light axis of the polarizing plate on the outgoing side and the polarized light axis on the polarizing plate on the incident side is approximately a right angle.

A case of the white display will be described hereinafter. Lights incident into the liquid crystal cell are the same as in the case of the black display. When voltage is not applied upon the liquid crystal cell, linearly polarized light where the plane of polarization of the incident linearly polarized light has been rotated by 90° by the rotation of the liquid crystal layer is outputted from the liquid crystal cell. When the linearly polarized light is inputted into the phase difference plate, it becomes elliptically polarized light and is outputted. The elliptical index of the elliptically polarized light is very small, and an angle between the direction of the plane of the polarization of the linearly polarized light to be inputted into the phase difference plate and an elliptical long axis is very small because of the small retardation of the phase difference plate. As the elliptical long axis of the elliptically polarized light to be outputted from the phase difference plate becomes parallel to the polarized light axis of the polarizing plate on the outgoing side, the elliptically polarized light approximately pass through the polarized beam plate on the outgoing side so that the white display is provided. Although a transmission index in the white display of the liquid crystal displaying apparatus is slightly lowered by the surface reflection of the phase difference plate, approximately 90% can be retained where the phase difference plate is not used.

An operation when the wavelength dependency between the liquid crystal cell and the phase difference plate has been taken into consideration will be illustrated. In the case of the white display, the direction of the plane of the polarization of the linearly polarized light incident from the liquid crystal cell becomes different due to the wavelength dependency of the rotational property of the liquid crystal cell. The elliptical index and the direction of the elliptical long axis become different for the elliptically polarized light due to the wavelength. Although this phenomenon appears as the wavelength dependency of the transmission index of the liquid crystal displaying apparatus, this is the same as the conventional NW mode TN crystal panel. As the retardation of the phase difference plate is smaller, the change is smaller by the wavelength as compared with the size of the average transmission factor, which is out of the question in practical use. In the case of the black display, the elliptical index of the elliptically polarized light incident from the liquid crystal cell becomes different by the wavelength. Since the elliptical factor of the outgoing elliptical polarized light is small and the polarization of the phase difference plate is also smaller, the wavelength dependency of the transmission index of the liquid crystal apparatus is very small. Considering the wavelength dependency of the liquid crystal cell and the phase difference plate, the problem in practical use is equally out of the question.

Since the transmission index in the white display is reduced slightly by the phase difference plate which is smaller in retardation, and the transmission factor in the black display is considerably improved in accordance with the present invention, superior displaying images can be obtained even if the light is inputted perpendicularly into the liquid crystal cell.

The operation of the present invention will be described hereinafter in further detail.

A model (FIG. 1) where the linearly polarized light is inputted perpendicularly into the phase difference plate will be shown. Assume that light is inputted from the reverse side of the paper face, and the retardation of the phase difference plate is sufficiently smaller than the wavelength of the incident light. Assume that an angle measured counterclockwise from the lagging axis of the phase difference plate in the polarization direction of the incident linearly polarized light L is α, and −45°≤α≤45°. In the case of 0°<α≤45°, a clockwise elliptically polarized light E is outputted as in shown in FIG. 1. An elliptical long axis A is located in an acute angle formed by the polarization direction of the linearly polarized light L and the lagging axis. Displace the lagging axis by a phase advancing axis and the direction of the elliptical long axis is not changed and the counterclockwise elliptically polarized light is outputted. In the case of $-45°\leq\alpha<0°$, counterclockwise elliptically polarized light are outputted, and the elliptical long axis A is in an acute angle formed by the polarization direction of the straight linearly polarized light L and the lagging axis.

The retardation R of the phase difference plate is expressed by $$R=\Delta n\cdot d \tag{1}$$

where
refractive index anisotropy is $\Delta n$, and thickness is d.

The phase difference $\delta$ between the advancing wave and the lagging wave of the phase difference plate is expressed by $$\delta=\frac{2\pi}{\lambda}R \tag{2}$$

An angle between by an elliptical long axis A of the outgoing elliptically polarized light E and a lagging axis is referred to as $\phi$, and a ratio of the length of the elliptical short axis B with respect to the length of the elliptical long axis A of the elliptically polarized light E is referred to as an elliptical index, and the elliptical index is Q. The elliptical index Q, and the azimuth $\phi$ of the elliptical long axis A are obtained respectively from the following equations (compiled by Applied Physical Society Optical Converzatione: "Crystal Optics" by Morikita Publishing Corp. Ltd. P81, in 1975)

$$\tan 2\phi=\tan 2\alpha\cdot\cos\delta \tag{3}$$

$$\sin 2x=\sin 2\alpha\cdot\sin\delta \tag{4}$$

$$\tan 2x=\pm Q \tag{5}$$

The $\pm$ of equation 5 shows the clockwise and the counterclockwise rotation of the plane of the polarization. Erase the x from equation 3 and equation 4 and the elliptical index Q becomes as follows.

$$Q=\frac{\sin 2\alpha\sin\delta}{1+\sqrt{1-\sin^2 2\alpha\sin^2\delta}} \tag{6}$$

Since $-1\leq\sin 2\alpha\leq 1$, the elliptical index Q can be changed in the following range by a change in $\alpha$ by the rotation of the phase difference plate.

$$0\leq Q\leq\frac{\sin\delta}{1+\sqrt{1-\sin^2\delta}} \tag{7}$$

Figure 2:
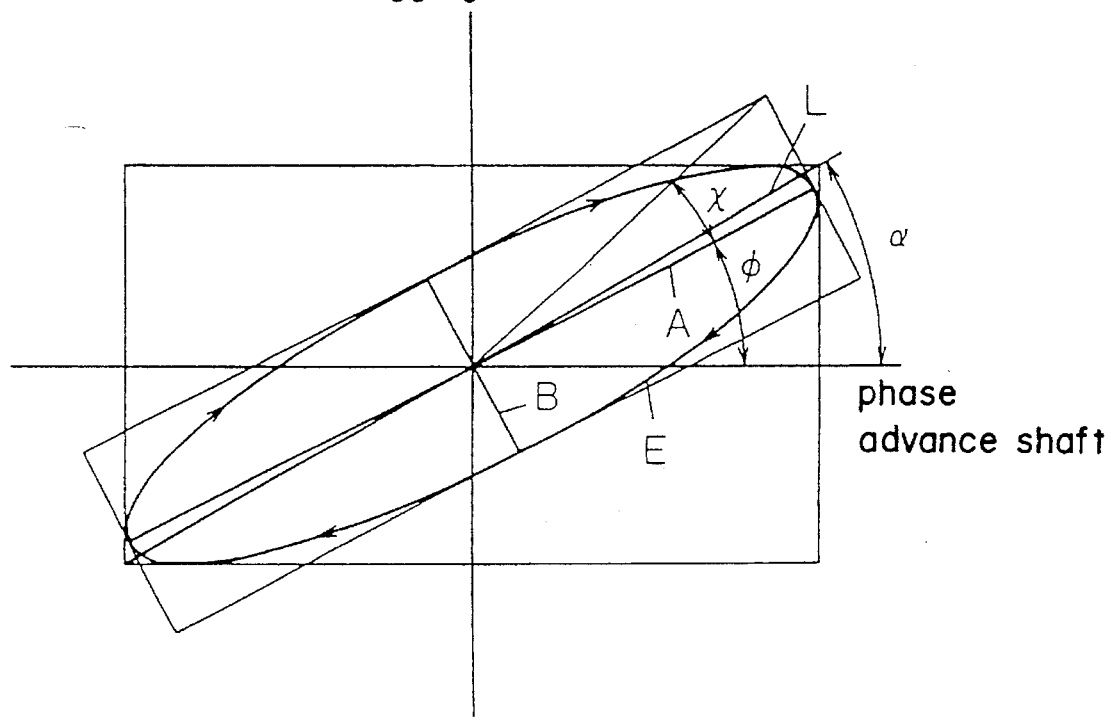
FIG. 2 is a schematic diagram for illustrating an operation of a phase difference plate of the present invention.

Place the same phase difference plate completely on the phase difference plate shown in FIG. 1 so as to make one advancing axis parallel to the other lagging axis, and the phase difference is removed and the linearly polarized light can proceed. When the elliptically polarized light E where the elliptical index is Q and the azimuth with respect to the advancing axis is $\phi$ is inputted into the phase difference plate as shown in FIG. 2, it can be understood that the light becomes linearly polarized light L and is outputted. When $\delta$ is made constant from equation 6, it can be understood that an optional elliptical index and an elliptically polarized light in an optional rotating direction can be converted into a linearly polarized light by the rotation of the phase difference plate, because the elliptical index Q is a function of $\alpha$. In the displacement between the lagging axis and the advancing axis, and the displacement of the code of Q, the phase difference plate has only to rotate within the range of $-45°$ through $+45°$ with respect to the elliptical long axis of the elliptically polarized light in the direction of the lagging axis or the advancing axis.

When the phase difference $\delta$ is sufficiently small, it can be approximated to $$\phi\approx\alpha \tag{8}$$

from equation 3.

This means that when the retardation of the phase difference plate is sufficiently small, the polarization direction when the linearly polarized light L is outputted from the phase difference plate is approximately parallel to the elliptical long axis A of the incident elliptical polarization E so that the polarizing plate on the outgoing side hardly has to be rotated.

The size of the retardation necessary for the phase difference plate will be described. Since the elliptical index Q of the outgoing elliptically polarized light when the linearly polarized light has been inputted into the liquid crystal cell and the given driving voltage for the black display has been applied on is considerably small, the phase difference plate is sufficient if the retardation is small.

Assume that $Q<<1$, and an approximation equation $$R\geq\frac{\lambda Q}{\pi} \tag{9}$$

is obtained from equation 2 and equation 7. A right-hand side of the equation 8 is a minimum value of the retardation R necessary for the phase difference plate. By an experiment using various liquid crystal cells, the elliptical index Q is approximately 0.02 through 0.03. When the wavelength is made x=540 nm high in visibility, the minimum value of the retardation necessary for the phase difference plate becomes 3 through 4 nm. Therefore, the retardation of the phase difference plate has only to be 3 through 4 nm or more. When the retardation of the phase difference plate is excessively large, it is hard to effect adjustment, because the sensitivity of the angular adjustment for making the transmission index minimum in the black display is high.

In accordance with the present invention, an elliptically polarized light small in an elliptical index which outputs from a liquid crystal cell when a maximum driving voltage is applied upon the NW mode TN liquid crystal cell is adapted to be converted into the linearly polarized light by a phase difference plate small in retardation, so that the transmission index in the black display can be made low. As a result, the light is inputted perpendicularly into the liquid crystal cell. If the maximum driving voltage is the same as before, the superior black display can be realized and the contrast of the projection image can be improved.

The embodiment of the present invention will be described hereinafter with reference to the drawings.

Figure 3:
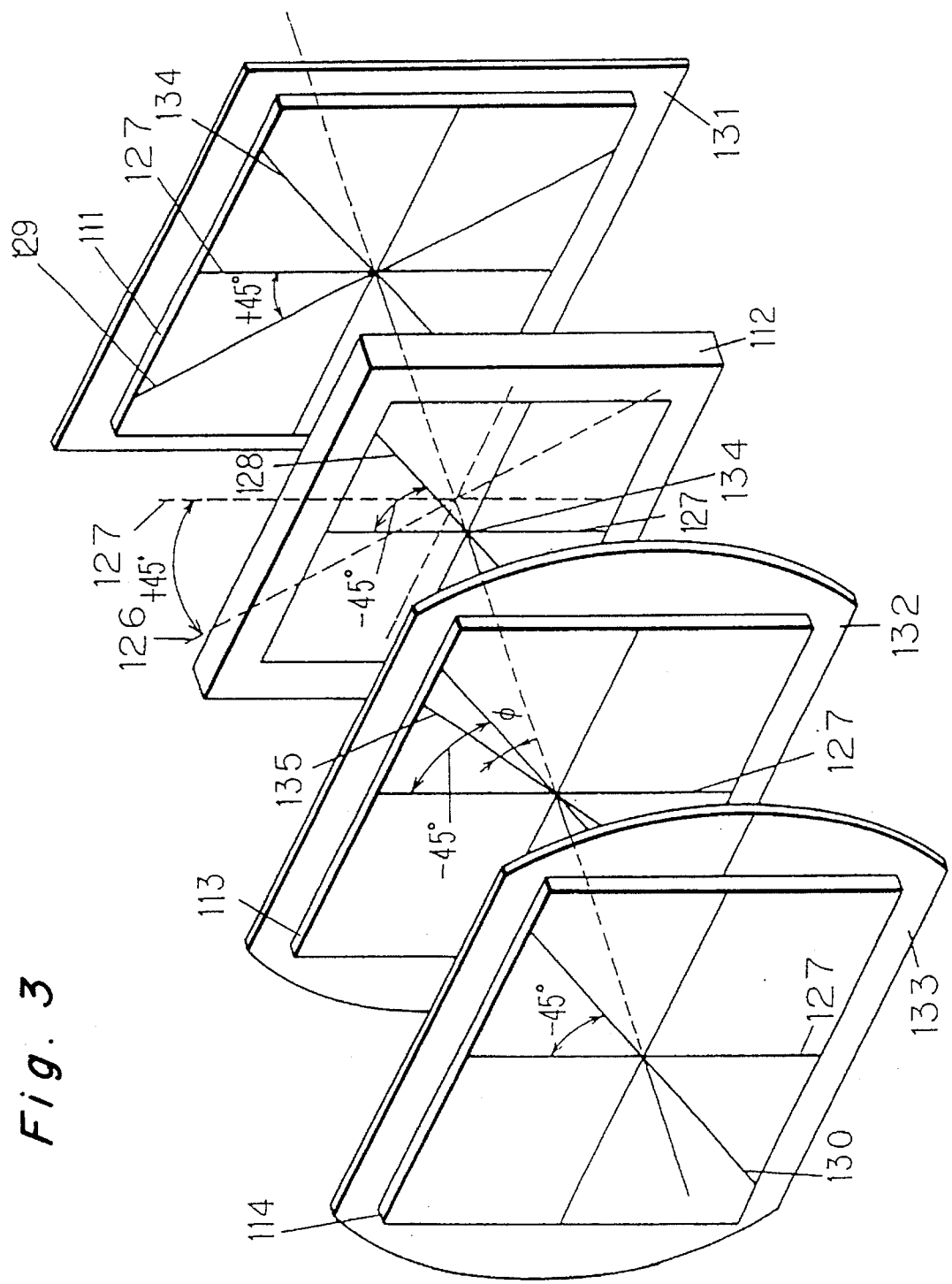
FIG. 3 is a perspective view showing the construction of a first embodiment of a liquid crystal displaying apparatus of the present invention.

FIG. 3 shows the schematic construction in a first embodiment of the liquid crystal displaying apparatus of the present invention.

The liquid crystal displaying apparatus is composed of a polarizing plate 111 on the incident (or input) side, a liquid crystal cell 112, a phase difference plate 113, and a polarizing plate 114 on the output side in order from the incident light side, which are respectively separated and disposed so that they are made parallel with respect to one another.

Figure 4:
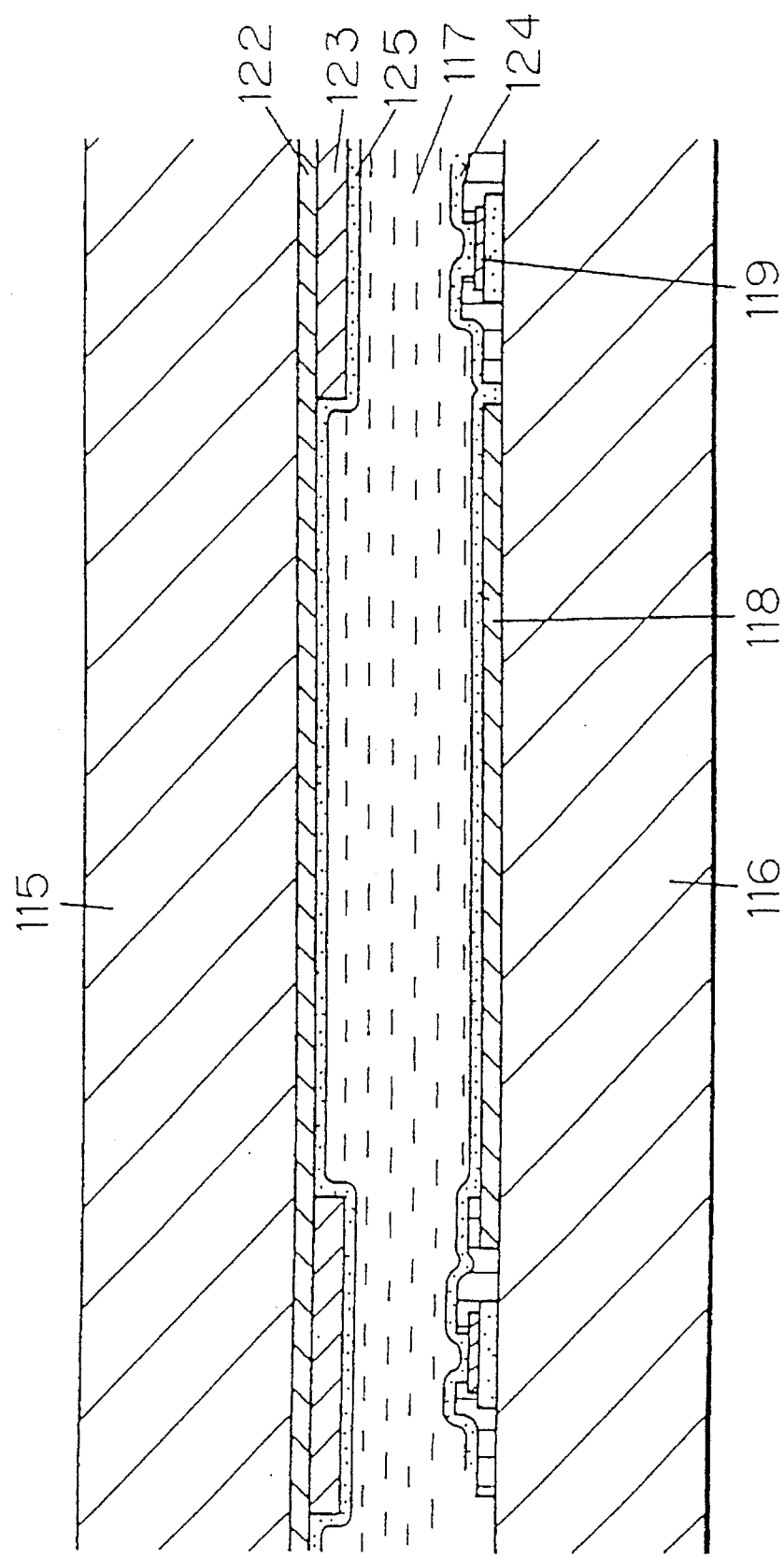
FIG. 4 is a sectional view showing the construction of a liquid crystal cell using a liquid crystal displaying apparatus shown in FIG. 3.

The liquid crystal cell 112 has a TN liquid crystal 117 twisted by 90° and charged between two glass substrates 115 and 116 as shown in FIG. 4. A picture element electrode 118, a TFT 119, a gate signal wire and a source signal wire (not shown) are formed on one substrate 116. An opposite electrode 122 is formed on the other substrate 115. A black matrix 123 for light shielding is formed on the electrode 122 so as to cover the TFT 119, the gate signal wire and the source signal wire. Alignment films 124 and 125 are formed respectively on the picture element electrode 118 and the opposite electrode 122. When the alignment films 124 and 125 are formed in one direction (rubbing processing), the liquid crystal molecule in contact with the alignment films is orientated along a rubbing direction in the long axis of the liquid crystal molecule. As shown in FIG. 3, the rubbing direction 126 on the incident side substrate 115 is +45° with respect to the picture face vertical direction 127 and the rubbing direction 128 on the outgoing side substrate is −45° with respect to the picture face vertical direction 127. The TN liquid crystal 117 attains a condition where a molecular axis has been twisted by 90° to the right. The thickness of the liquid crystal layer 117 is approximately 5 μm. A polarized axis 129 of the polarizing plate 111 on the incident side is parallel to the rubbing direction of the substrate 115 on the incident side, and the polarized light axis 130 of the polarizing plate 114 on the outgoing side is parallel to the rubbing direction 128 of the substrate plate 116 on the outgoing side. The liquid crystal displaying apparatus is of the NW mode.

In order to effect a color display operation with the construction shown in FIG. 4, mosaic shaped color filters (not shown) of red, green and blue may be provided between the glass substrate 116 and the opposite electrode 122 or between the opposite electrode 122 and the orientation (alignment) film 125.

The phase difference plate 113 is made birefrangible by the extension of a film of polyvinyl alcohol (PVA) in one direction by an extending machine. Since the refractive index of the extending direction is high and a refractive index of the vertical direction perpendicular to it is low, the extending direction becomes a lagging axis and the direction perpendicular to it becomes an advancing axis. The thickness of the film is 20 μm and the retardation of 540 nm in wavelength is 22 nm and is considerably smaller than the wavelength of visible light.

The polarizing plate 111 on the incident side, the phase difference plate 113 and the polarizing plate 114 on the outgoing side are mounted respectively on frame members 131, 132 and 133. Two frame members 132 and 133 are rotatable around a normal line of a liquid crystal layer passing through the picture face center of the liquid crystal cell 112. An advancing axis 135 of the phase difference plate 113 and the polarized light axis 130 of the polarizing plate 114 on the outgoing side can be changed in angle with respect to the picture face vertical direction 127 by the rotation of the frame members 132, 133, respectively. The direction of the advancing axis 135 of the phase difference plate 113 can be changed in the range of −45° through 45° with the absorption axis 134 of the polarizing plate 111 on the incident side being provided as a standard. In the construction shown in FIG. 3, the direction of the lagging axis of the phase difference plate 113 may be changed in the range of −45° through 45° with the absorbing axis 134 of the polarizing plate 111 on the incident side being provided as a standard.

The contrast adjustment of the liquid crystal displaying apparatus is effected as follows. A liquid crystal displaying apparatus is placed on a white face light source with the lagging axis 135 of the phase difference plate 113 being made parallel to the polarized light axis 130 of the polarizing plate 114 on the outgoing side. A given driving voltage for the black display is applied on the whole picture face of the liquid crystal cell 112. The brilliance of the display image is adjusted to its lowest by the rotation of the polarizing plate 114 on the outgoing side, while the display image of the liquid crystal cell 112 is being watched from the given direction. Then, the phase difference plate 113 is rotated and the contrast is adjusted to its best. In many cases, the contrast adjustment can be effected only by this rotation. But when the brilliance of the display image is uneven, the adjustment of the brilliance uniformity may be effected by alternate rotation of the polarizing plate on the outgoing side 114 and the phase difference plate 113 little by little. Dispersion in the direction of the polarized light axis of the polarizing plate 111 on the incident side, dispersion of the polarized light degree of the outgoing elliptical polarized light of the liquid crystal cell 112 and the dispersion in the retardation of the phase difference plate 113 can be absorbed by the rotation adjustment.

The liquid crystal displaying apparatus shown in FIG. 3 is slightly reduced in transmission index in the white display by the phase difference plate 113 which is small in retardation. As the transmission index in the black display can be considerably improved, the displaying images superior in contrast can be obtained.

Figure 5:
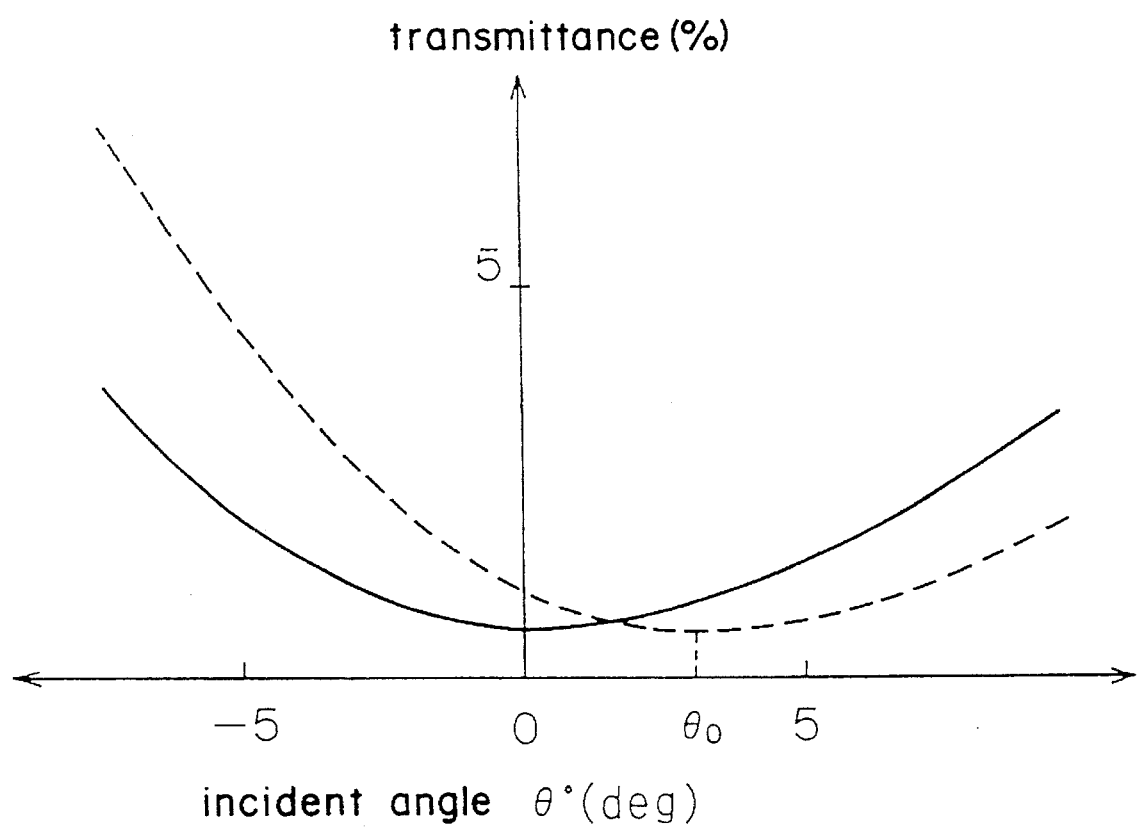
FIG. 5 is a characteristic graph showing the relationship between a transmission index and an incident angle of the liquid crystal displaying apparatus of the present invention.

An experiment using a liquid crystal displaying apparatus shown in FIG. 3 will be described. When the transmission index, with the light perpendicularly incident, is adjusted to become minimum and the driving voltage of the liquid crystal displaying apparatus is 5.0 V, the relationship between the transmission index and the incident angle θ of the incident light becomes as shown with a solid line in FIG. 5. The incident light stays within a plane face including the normal of the substrate and the picture face vertical direction. Assume that an angle with respect to the polarized light axis of the polarizing plate 114 on the outgoing side in a direction of the advancing axis 135 of the phase difference plate 113 is φ, and φ=5°. A break line of FIG. 5 is a characteristic when the phase difference plate 113 does not exist. The transmission index becomes minimum when the incident angle is 3°. When the incident light is within the plane face including the normal of the liquid crystal layer 117, the picture face horizontal direction is approximately symmetrical with respect to right and left sides. The transmission index when the light is perpendicularly incident in FIG. 5 is found to be reduced by the use of the phase difference plate. The minimum value of the transmission index when the phase difference plate is used is found to be approximately the same as when the phase difference plate is not used. It is confirmed that the contrast is improved by the use of the phase difference plate.

Figure 6:
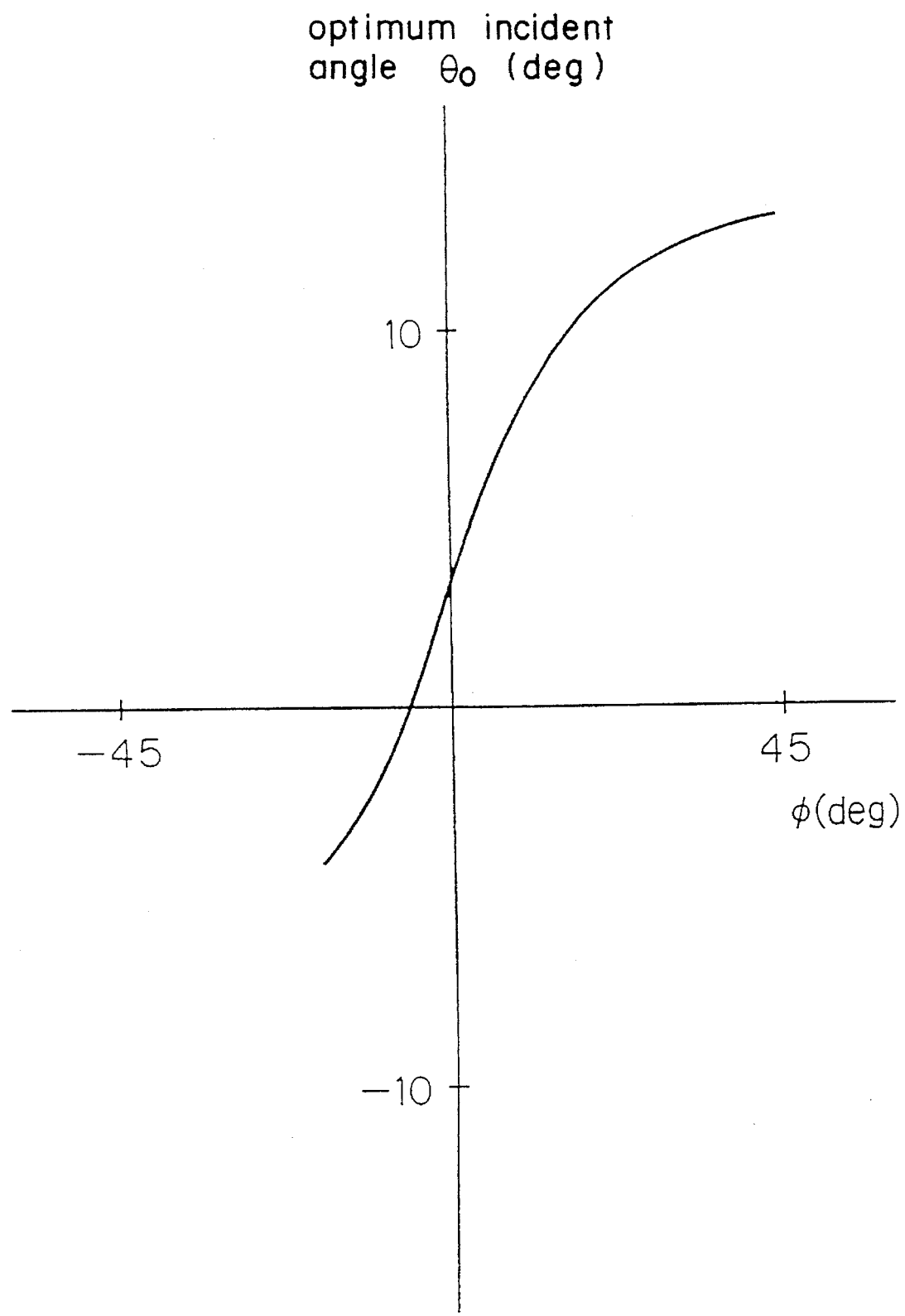
FIG. 6 is a characteristic graph showing the relationship between an optimum incident angle of a liquid crystal displaying apparatus of the present invention and an azimuth of a phase difference plate.

When the incident light is within a plane face including the normal of the substratum and the picture face perpendicular direction, an incident angle where the transmission index in the black display is made θo and the relation between the optimum incident angle θo and the azimuth φ of the phase difference plate 113 is shown in FIG. 6. It is shown in FIG. 6 that an incident angle where the transmission index in the black display becomes minimum is changed by the rotation of the phase difference plate. A case of φ=0° is the same as a case where the phase difference plate 113 does not exist. θo=3.0°. When the phase difference plate 113 exists, θo=+1° through +8° and φ=−5° through +10°. It is shown in FIG. 6 that an optimum incident angle θo is shifted by 3° through 4° by the insertion of the phase difference plate 113 and superior contrast is obtained even in the perpendicular input operation. When the lagging axis of the phase difference plate 113 is displaced by an advancing axis for an experiment, it is given characteristics similar to those shown in FIG. 6, but with right and left side of FIG. 6 inverted.

An angle φ formed by the advancing axis 135 of the phase difference plate 113 and the polarized light axis 130 of the polarizing plate on the outgoing side is different by the amount of retardation of the phase difference plate 113. The smaller the retardation becomes, the larger the angle φ becomes. As a result of various examinations, it has been found that the retardation of the phase difference plate has only to be selected from the range of 5 nm through 50 nm with light having a wavelength of 540 nm. When the retardation is 5 nm or lower, the elliptically polarized light to be outputted from the liquid crystal cell 113 cannot be made a linearly polarized light. When the retardation is 50 nm or more, the adjustment is hard to effect, because the sensitivity when the phase difference plate 113 is adjusted rotatably is excessively high.

Optical crystals such as liquid crystal, mica or the like, or transparent resin films such as polyvinylidene fluoride (PVdF), triacetate (TAC), diacetate, cellophane, polyether sulfone (PES), polyether ether ketone (PEEK), poly sulfone (PSF), polycarbonate (PC), polyethylene telefutalate (PET), polyvinyl alcohol (PVA), saran, polyarylate or the like can be used as a material for the phase difference plate 113. As the optical crystal is generally very expensive, the transparent region film may be used. The phase difference plate may be formed as a film or in a plate shape. The phase difference film may be pasted on the glass substrate. PC, PES, PVA are preferable in that they are easy to work with, have a good service life, are uniformed in characteristics and so on. A plurality of transparent resin films using the above described materials may be combined.

Figure 7:
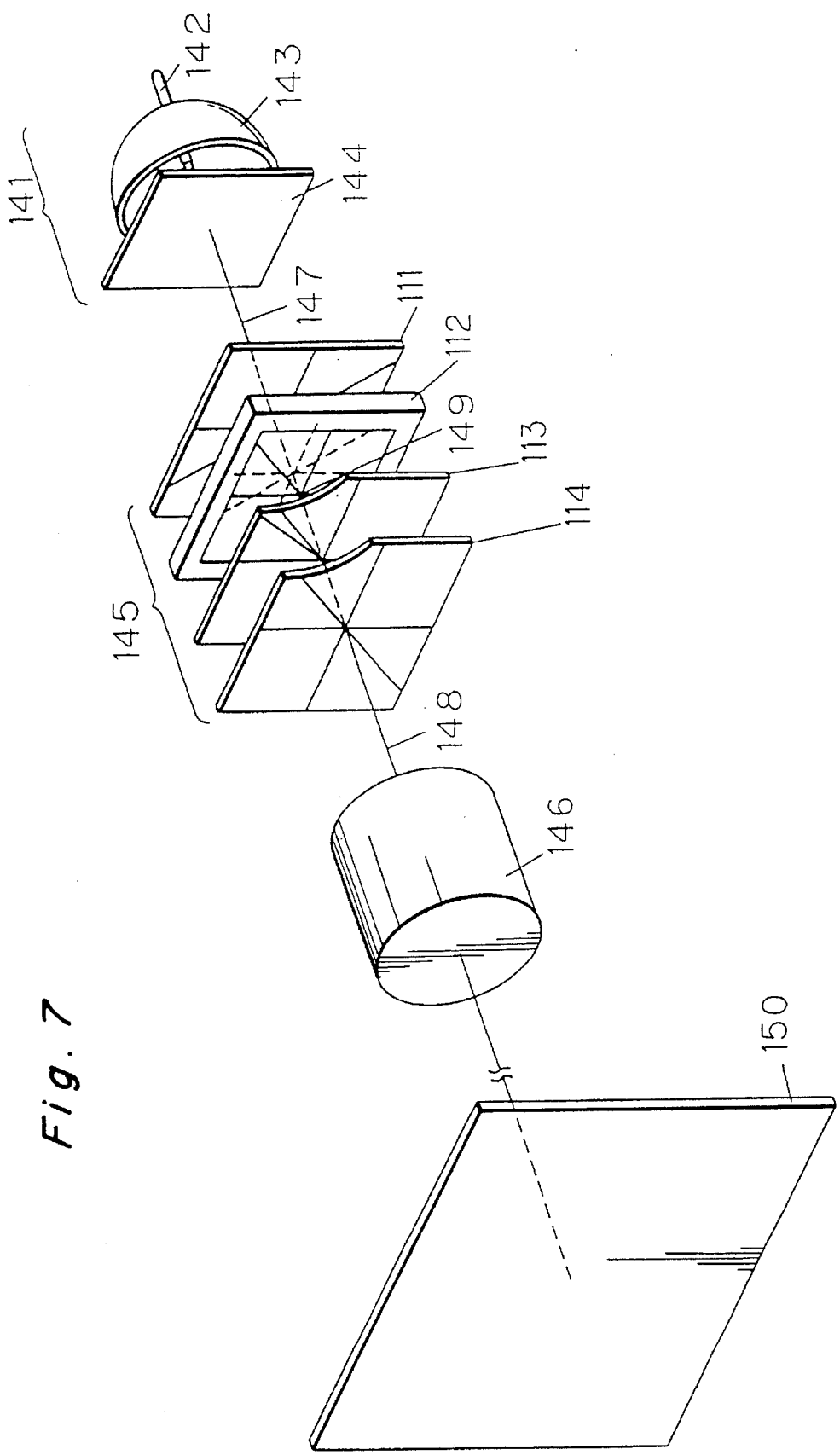
FIG. 7 is a schematic construction view showing the construction of a first embodiment of a projection type displaying apparatus of the present invention.

FIG. 7 shows a schematic construction in one embodiment of the projection displaying apparatus of the present invention. Reference numeral 141 is a light source, reference numeral 145 is a liquid crystal displaying apparatus and reference numeral 146 is a projection lens. The liquid crystal displaying apparatus 145 has color filters built in the construction shown in FIG. 3.

The light source 141 is composed of a lamp 142, a concave mirror 143, and a filter 144. A halogen lamp is used as the lamp 141. Lights irradiated from the lamp 141 are collected by the concave mirror 142, are converted into light closer to parallel and are inputted into the filter 144. The filter 144 has an evaporated multi-layer film for reflecting infrared rays onto the glass substratum so as to transmit visible light. Visible light closer to parallel is outputted from the filter 144. The outgoing light from the light source 141 is transmitted through the liquid crystal displaying apparatus 145 and is inputted into a projection lens 146.

The light axis 147 of the light source 141 conforms to the light axis 148 of the projection lens 146. In the liquid crystal displaying apparatus, the center 149 of the picture face is on the light axis 148. The liquid crystal layer 117 is perpendicular to the light axis 148. The projection lens 146 is telocentric. Namely, major light rays of a light which becomes incident to the projection lens 146 from each picture element of the liquid crystal cell 112 are all approximately parallel to the light axis 148.

Full color optical images are formed as changes in transmission index in the liquid crystal displaying apparatus 145. The optical images are enlarged, and projected on the screen 150 by the projection lens 146. The contrast has only to be adjusted to its best by rotation of the polarizing plate 114 on the outgoing side, and further by the rotation of the phase difference plate 113. As the liquid crystal displaying apparatus 145 compensates by slight retardation of the phase difference plate 113 in the black display of the liquid crystal cell 112, the transmission index in the black display is reduced, so that a projecting image of high contrast can be obtained.

In the construction shown in FIG. 7, when the picture face size of the liquid crystal cell 112 is 6φ mm horizontally, and 46 mm vertically, the relative aperture ratio of the projection lens 146 is F3.5, and the maximum driving voltage of the liquid crystal cell 112 is 5.2 V, the contrast in the picture face center of the projection image is 130:1 when the phase difference plate 113 is absent, and 210:1 when the phase difference plate 113 is present. It is confirmed from this fact that the contrast of the projection images is considerably improved by the use of the phase difference plate 113.

Figure 8:
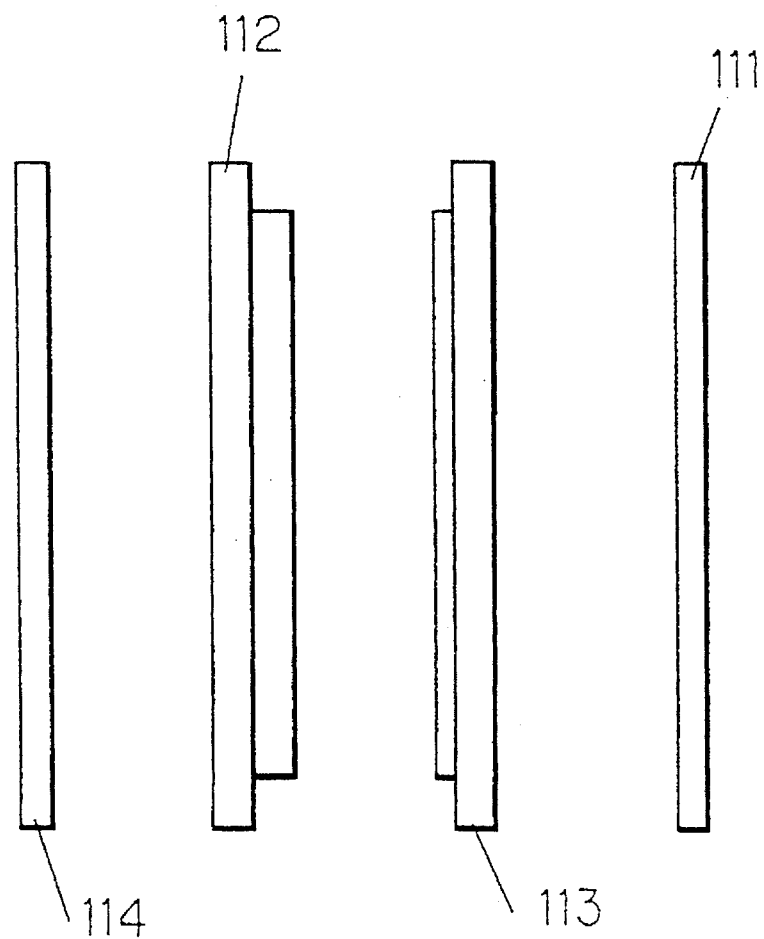
FIG. 8 is a schematic construction view showing the construction of a second embodiment of the liquid crystal displaying apparatus of the present invention.

FIG. 8 shows the construction of a second embodiment of the liquid crystal displaying apparatus of the present invention, where reference numeral 111 is a polarizing plate on the incident side, reference numeral 112 is a liquid cell, reference numeral 113 is a phase difference plate, and reference numeral 114 is a polarized plate on the outgoing side. Although FIG. 3 shows a case where the phase difference plate 113 is disposed between the liquid crystal cell 112 and the polarizing plate 114 on the outgoing side, the phase difference plate 113 may be disposed between the polarizing plate 111 on the incident side and the liquid crystal cell 112 as shown in FIG. 8. Since the construction shown in FIG. 8 is the same but opposite in the direction along which the light is advancing with respect to the construction shown in FIG. 3, the same effect in the contrast improvement by the phase difference plate 113 is obtained.

If the retardation of the phase difference plate 113 is small, the phase difference plate 113 can be pasted on the polarizing plate 111 on the incident side, the crystal cell 112 or the polarizing plate 114 on the outgoing side in the construction shown in FIG. 3 and FIG. 8. When the phase difference plate 113 is pasted on the liquid crystal cell, the direction of the advancing axis is likely to be deviated with respect to the given direction, namely, is deviated by, for example, approximately ±1°. As the sensitivity of the rotary angle of the phase difference plate 113 with respect to the contrast is low when the retardation of the phase difference plate 113 is as small as approximately 20 nm, it is out of the equation in practical use if the direction of the advancing axis of the phase difference plate 113 is deviated by approximately ±1° from the given direction, because the sensitivity of the rotary angle of the phase difference plate 113 with respect to the contrast is low.

When the phase difference plate 113 is pasted on the polarizing plate 111 on the incident side, the liquid crystal cell 112 or the polarizing plate 114 on the outgoing side, the transmission index of the liquid crystal displaying apparatus is improved, because the surface reflection is reduced on two combined faces. Three of the phase difference plate 113, the liquid crystal cell 112, and the polarizing plate 114 on the outgoing side may be pasted so that the transmission index of the liquid crystal displaying apparatus is further improved. Since the polarizing plate 111 on the incident side is heated by the absorption of one portion of the incident light so as to raise the temperature by the conduction of the heat into the liquid crystal cell 112, it is desirable to separate the polarizing plate 111 on the incident side from the liquid crystal cell 112.

Figure 9:
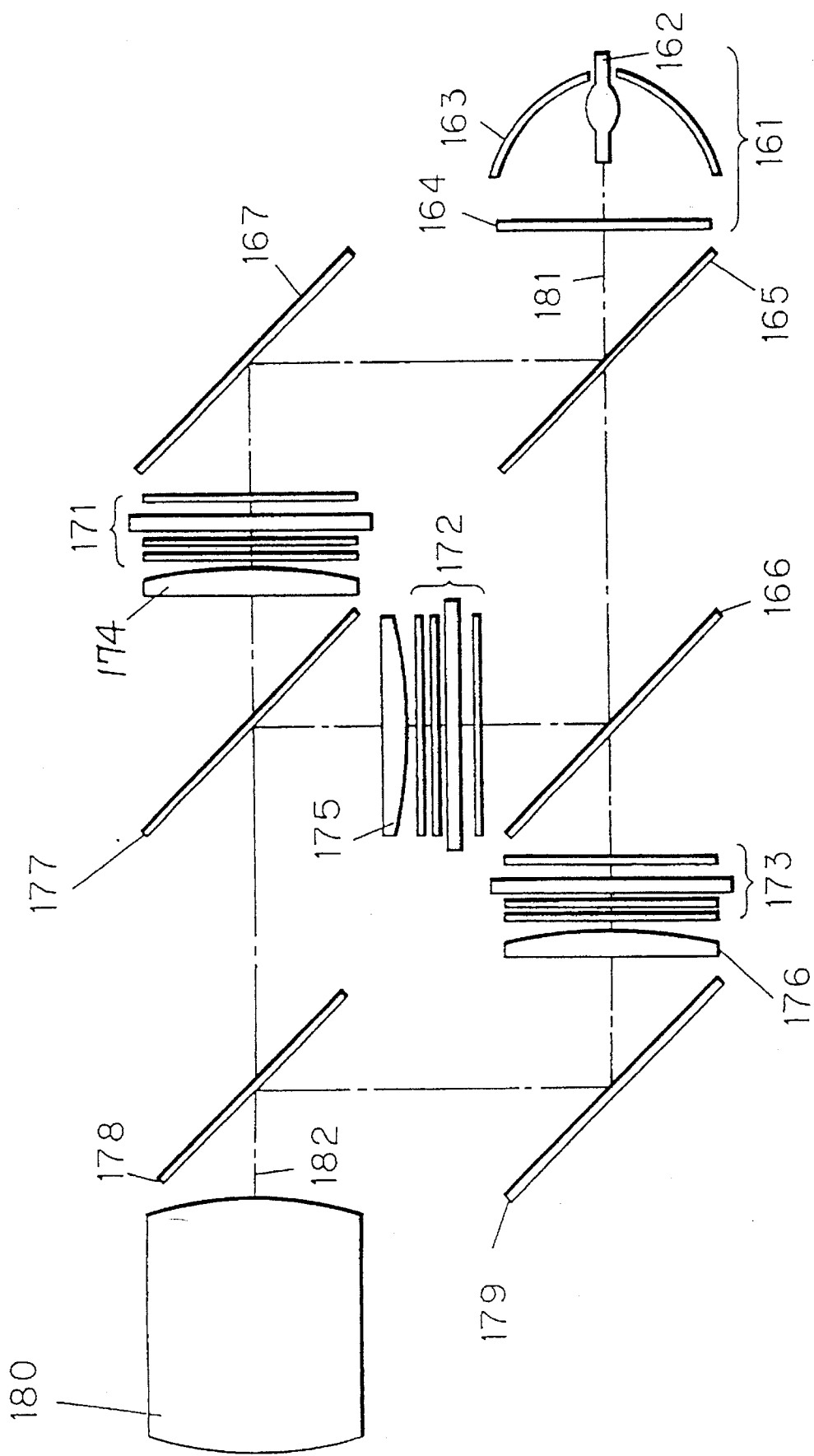
FIG. 9 is a schematic construction view showing the construction of a second embodiment of the projection displaying apparatus of the present invention.

FIG. 9 shows the construction of a second embodiment of the projection displaying apparatus of the present invention.

Reference numerals 171, 172, 173 are liquid crystal displaying apparatuses, which are respectively the same as the liquid crystal displaying apparatus shown in FIG. 3. Three liquid crystal displaying apparatuses are used for red, green and blue use so as to obtain color projection images.

The light source 161 is composed of a lamp 162, a concave mirror 163, and a filter 164. The lamp 162 is a metal haride lamp of 250 W in lamp power and is adapted to irradiate light including color components of three primary colors of red, green and blue. Light irradiated from the lamp 162 is collected by the concave mirror 163, is converted into light close to parallel, and is incident into the filter 164. The filter 164 comprises a multilayer film evaporated on a glass substrate. The infrared light and ultraviolet light are adapted to be reflected onto the glass substrate so as to let visible light pass through the multilayer film. The infrared light and the ultraviolet light are removed from the light output from the concave mirror 163 so as to output the visible light.

The outgoing light from the light source 161 is resolved into the three primary colors of red, green and blue by dichromic mirrors 165, 166 and a flat mirror 167. The respective primary color lights are respectively inputted into the liquid crystal displaying apparatuses 171, 172 and 173. The outgoing light from the liquid crystal displaying apparatuses 171, 172 and 173 respectively pass through auxiliary lenses 174, 175 and 176, and thereafter are composed into one light by the dichromic mirrors 177, 178 and a flat face mirror 179, and are inputted into a major projection lens 180. Illumination distances to the respective liquid crystal displaying apparatuses 171, 172 and 173 from the light source 161 are equal with respect to each other. Light path distances from the liquid crystal displaying apparatuses 171, 172 and 173 to the major projection lens 180 are also equal.

A light which is output along a light axis 181 of a light source transmits perpendicularly through the centers of respective picture faces of the respective liquid crystal displaying apparatuses 171, 172 and 173 so as to conform to the light axis 182 of the major projection lens 180. When the major projection lens 180 is combined with one of the auxiliary lenses 174, 175 and 176, it functions as one projection lens. The relative aperture of the projection lens is F4.0. Auxiliary lenses 174, 175 and 176 function to make the light telocentric on the side of the liquid crystal displaying apparatus. Optical images are formed as changes in transmission index respectively in accordance with the image signals on the liquid crystal displaying apparatuses 171, 172 and 173. Respective optical images are composed into color images by the dichromic mirrors 177, 178, and the flat face mirror 179, and are enlarged and projected onto the screen by the major projection lens 180.

In a projection type displaying apparatus of the construction shown in FIG. 9, the brilliance in the picture face center is 10 ft-L, the contrast in the picture face center is 260:1, the contrast of the upper and lower ends of the picture face is 210:1 when the projection is effected on a screen of 100 inches in diagonal length and of 1.6 in the central gain. When the contrast is measured in the construction where the phase difference plate is removed from the construction shown in FIG. 9, the contrast is 150:1 in the picture face center, 130:1 in the upper end of the picture face, and 100:1 in the lower end of the picture face. It can be confirmed from the above description that the contrast is considerably improved by the use of the phase difference plate. In the construction shown in FIG. 9, as compared with the construction shown in FIG. 4, the light use efficiency is higher, because the color filter is not used and projection images bright in high resolution degree can be obtained, because there are three times as many picture elements.

Figure 10:
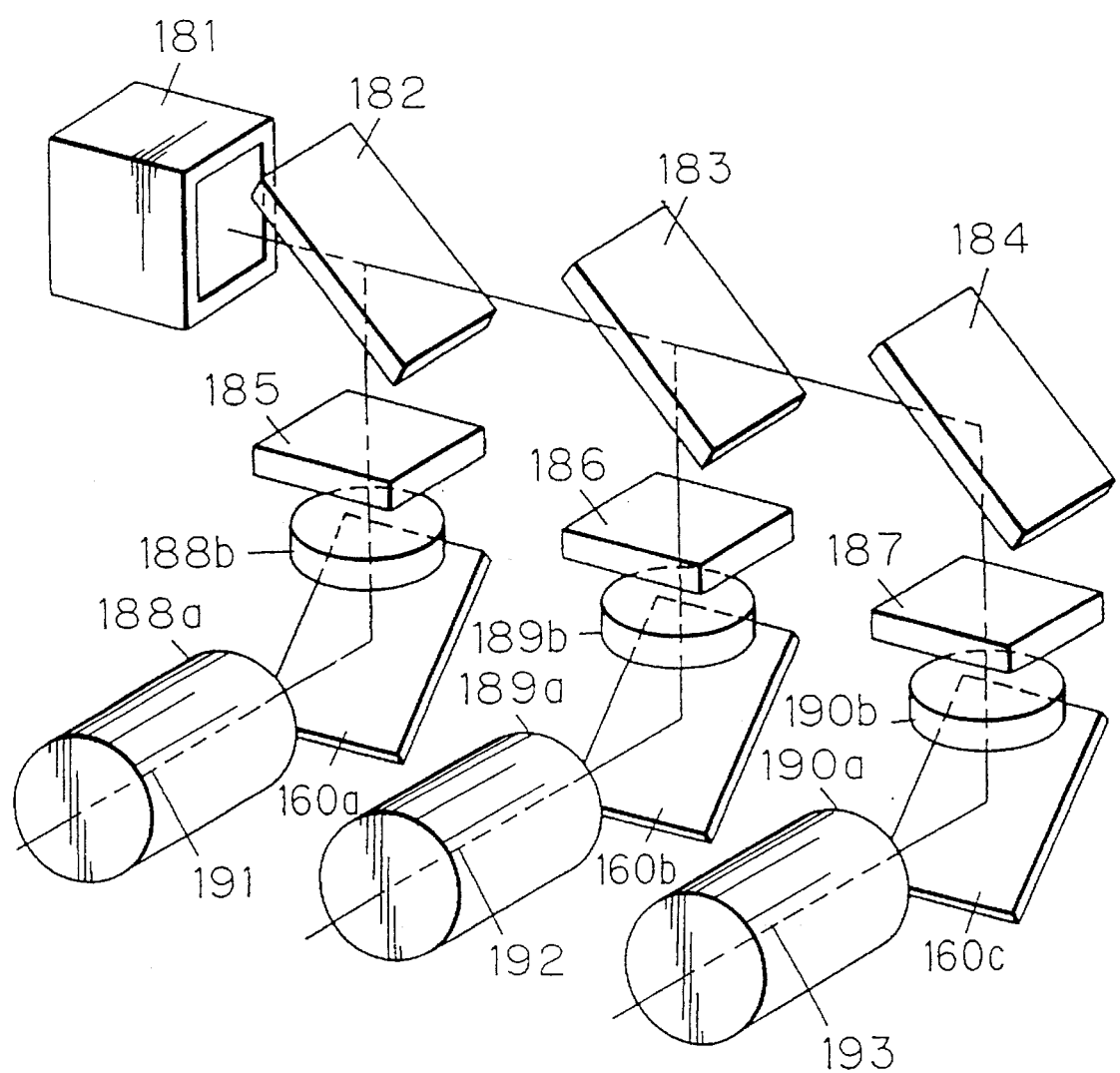
FIG. 10 is a sectional view showing the construction of a projector of a third embodiment of the projection displaying apparatus of the present invention.
Figure 11:
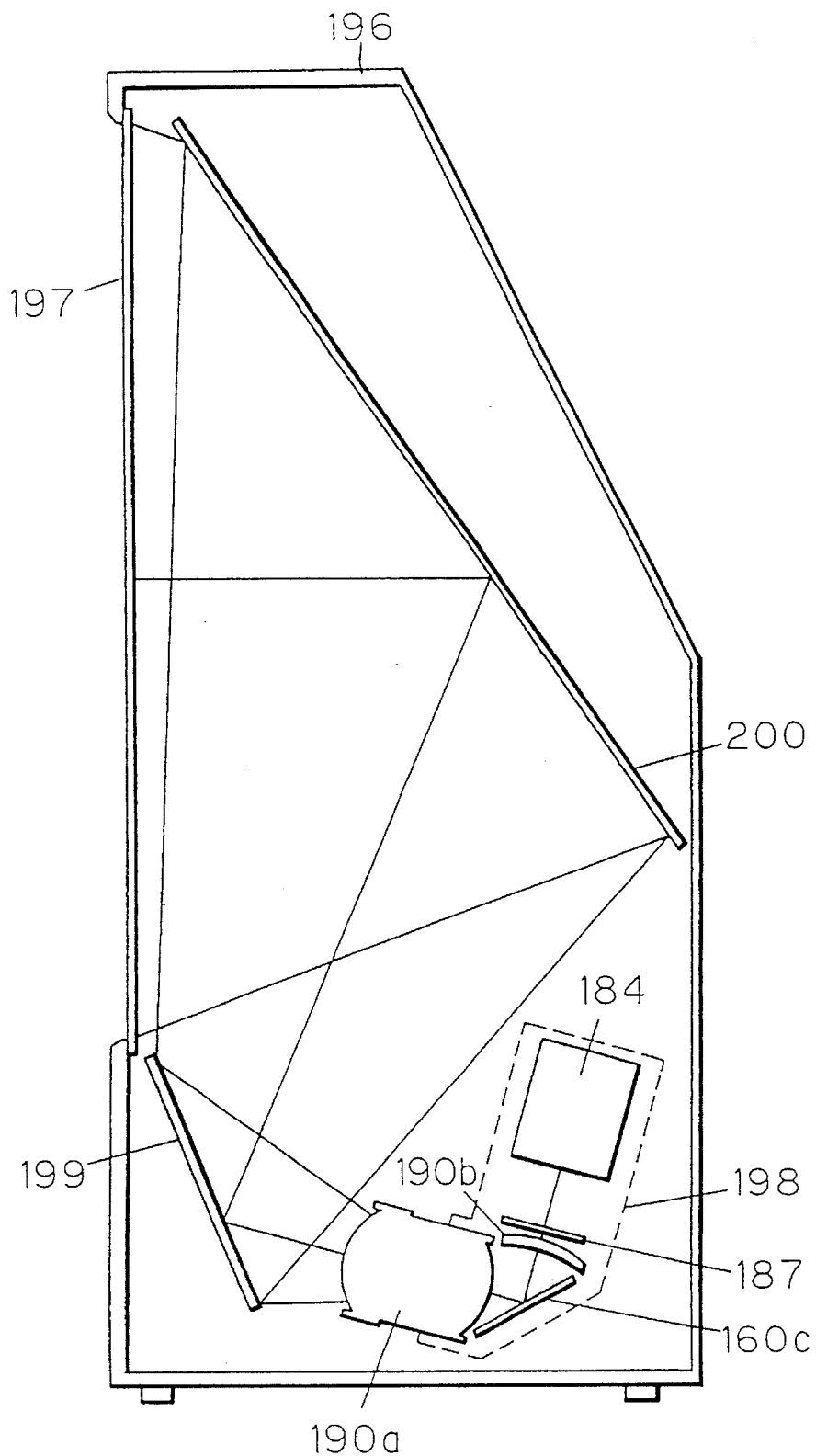
FIG. 11 is a sectional view showing the construction of a cabinet interior in the third embodiment of the present invention.

FIG. 10 and FIG. 11 show the construction of a third embodiment of the projection displaying apparatus of the present invention. Reference numeral 181 is a light source, reference numerals 182, 183 are dichromic mirrors, reference numeral 184 is a flat face mirror, reference numerals 185, 186 and 187 are liquid crystal displaying apparatuses, reference numerals 188, 189 and 190 are projection lenses, reference numeral 196 is a cabinet, reference numeral 197 is a screen and reference numeral 198 is a projector. The liquid crystal displaying apparatuses 185, 186 and 187 are the same as shown in FIG. 3.

A light outputted from the light source 181 is inputted into a color resolving optical system composed of the dichroic mirrors 182, 183 and the flat mirror 184, and is resolved into lights of three primary colors of red, green and blue. The respective color light are respectively transmitted through the liquid crystal displaying apparatuses 185, 186 and 187, and thereafter, are inputted into projecting lenses 188, 189 and 190. Optical images are formed as changes in the transmission index in accordance with the image signals on the liquid crystal displaying apparatuses 185, 186 and 187. The optical images on three liquid crystal displaying apparatuses 185, 186 and 187 are respectively enlarged and projected onto the screen 197 by corresponding projection lenses 188, 189 and 190. Reference numerals 160a, 160b and 160c are mirrors. For superposition of three colors of projection images on the screen 197, optical axes 191, 192 and 193 of the three projection lenses 188, 189 and 190 are made parallel to one another. The picture face centers of the liquid crystal displaying apparatuses 185 and 187 are slightly deviated from the optical axes 191 and 193 of the projection lenses 188 and 190.

The construction within the cabinet 196 of the projection displaying apparatus using the projector 198 shown in FIG. 10 is shown in FIG. 11. The transmission type screen 197 is disposed in the upper portion of the front side of the cabinet 196 and the projector 198 is disposed in the lower portion of the cabinet. A flat face mirror 199 is disposed forwardly of the lower portion and a flat face mirror 200 is disposed rearwardly of the screen 197. The projection distance (light path length from the projection lens to the screen center) is made shorter and the projector 198 is made smaller in size so that the cabinet 196 can be made more compact.

Figure 12:
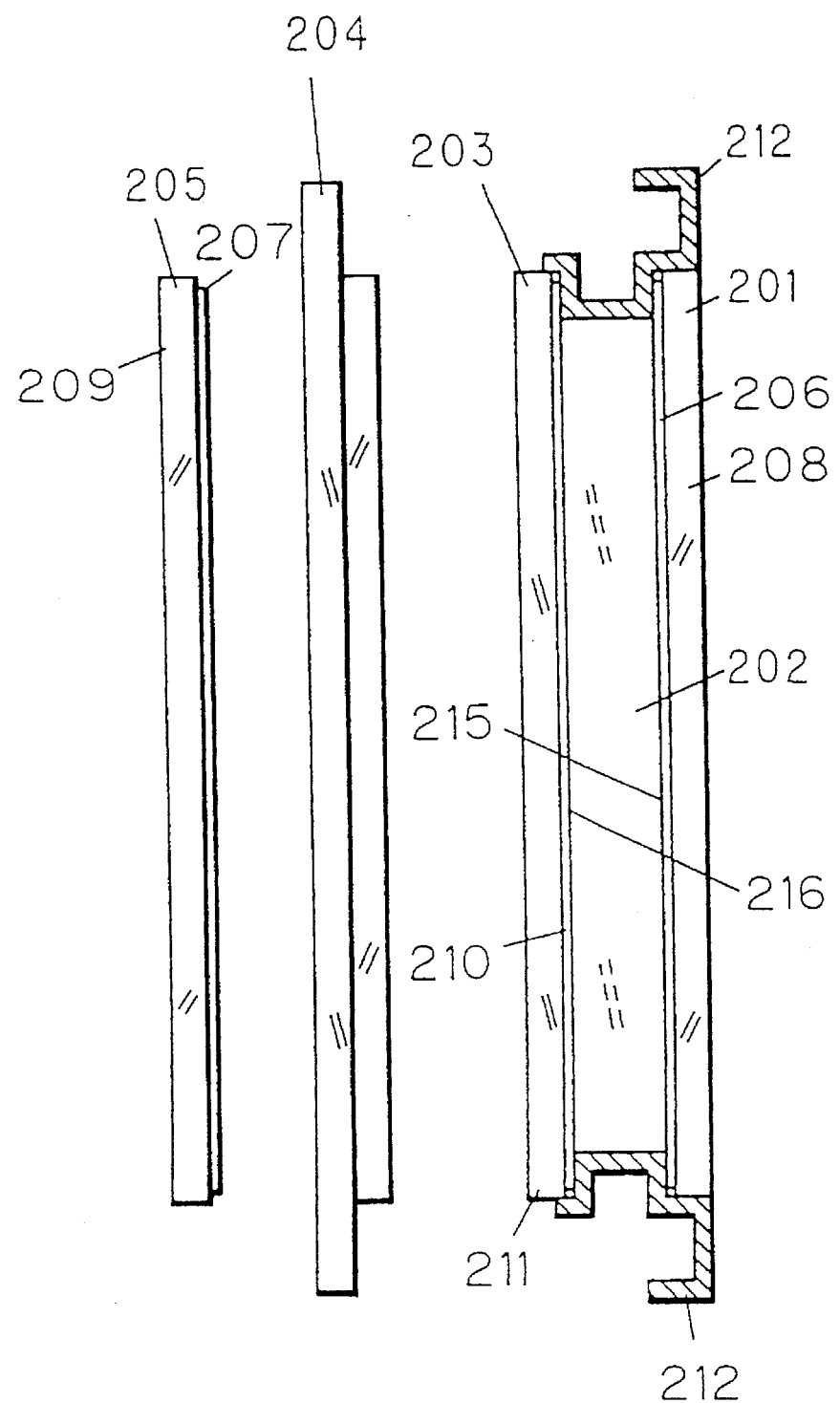
FIG. 12 s a sectional view showing the construction of the third embodiment of a liquid crystal displaying apparatus of the present invention.

FIG. 12 shows the construction of a third embodiment of a liquid crystal displaying apparatus of the present invention. Reference numeral 201 is a polarizing plate on the incident side, reference numeral 202 is a gel like transparent body, reference numeral 203 is a phase difference plate, reference numeral 204 is a liquid crystal cell, reference numeral 205 is a polarizing plate on the outgoing side and reference numeral 212 is a frame member. The liquid crystal displaying apparatus is the same as that shown in FIG. 3 except for the gel like transparent body 202.

The polarizing plate 201 on the incident side, and the polarizing plate 205 on the outgoing side have the polarizing films 206 and 207 pasted respectively on the glass substrates 208 and 209. The phase difference plate 203 has the phase difference film 210 pasted on the glass substrate 211. The phase difference film 210 is a transparent film. The gel like transparent body 202 is filled into a space bounded by the polarizing plate 201 on the incident side, the phase difference plate 203 and the frame member 212.

Figure 13:
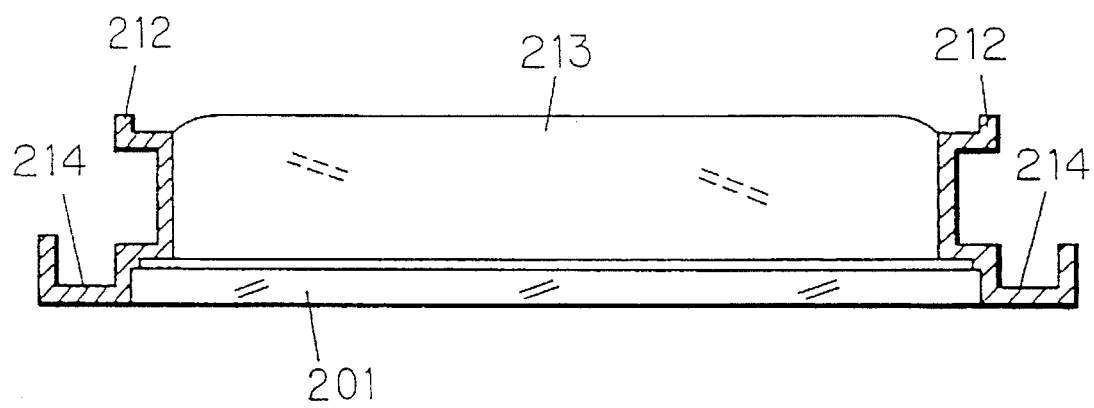
FIG. 13 is a sectional view for illustrating a condition as to how the liquid crystal displaying apparatus is being assembled as shown in FIG. 12.

For example, a gel like transparent silicone resin KE1051 of Shin-etsu Chemical Industry (Ltd.) can be used as the gel like transparent body 202. The material is placed in a gel condition when it is hardened by leaving it at room temperature or by heating it after two liquids have been mixed with it. In order to fill the gel like transparent material body 202 between the polarizing plate 201 on the incident side and the phase difference plate 203, the following operation is necessary. As shown in FIG. 13, a thin frame member 212 using silicone rubber is pasted on the polarizing plate 201 on the incident side with a tacky producer so as to compose a container capable of retaining a liquid. Two mixed liquids 213 of the KE1051 material are poured in an amount slightly greater than a given amount so as to superpose on it the phase difference plate 203. Surplus liquid stays in a groove 214 provided around the frame member 212. Leave it at a room temperature and the interior liquid is hardened to a gel. The frame member 212 may be removed after the hardening operation.

In the construction shown in FIG. 12, the phase difference plate 203 can be rotated slightly. In a disk of 3 mm in thickness and 80 mm in diameter using, for example, the KE1051 material, it neither comes off or cracks and double refraction is hardly caused inside if it is rotated by ±2°. The double refraction is not caused, because stress is dispersed immediately if stress is caused inside by the twisting operation of the gel like transparent body by the rotation.

As the reflective index after the hardening operation of the KE1051 is 1.40, the reflection index of the boundary face 215 between the polarizing plate 201 on the incident side and the gel like transparent body 202, and the reflection index of the boundary face 216 between the phase difference plate 203 and the gel like transparent body 202 become very small such as approximately 0.2%. The boundary faces 215 and 216 are respectively approximately 4% in reflection index in the absence of the gel like transparent body 202. Thus, the transmission index of the liquid crystal displaying apparatus is improved by approximately 10% by the use of the gel like transparent body 202.

When the phase difference plate 203 is separated from the other optical device so as to rotate the phase difference plate 203, the surface reflection is increased because of the presence of two faces at the boundary face with air, and the light use efficiency is lowered. As the liquid crystal displaying apparatus shown in FIG. 12 can rotate the phase difference plate 203 without reduction in the transmission index, and bright display images can be obtained with high contrast. Bright projection images with high contrast can be obtained with the use of the liquid crystal displaying apparatus for a projection displaying apparatus shown in FIG. 4 or FIG. 6.

In the construction shown in FIG. 12, the gel like transparent body can be filled between the polarizing plate 201 on the incident side and the phase difference plate 203 or between the liquid crystal cell 204 and the polarizing plate 205 on the outgoing side. In the construction as shown in FIG. 12, transparent liquid such as ethylene glycol, silicone oil or the like, can be used instead of the gel like transparent body 202. In this case, a construction is required to prevent liquid from leaking.

The other liquid crystal displaying apparatus of the present invention will be described hereinafter.

Figure 14:
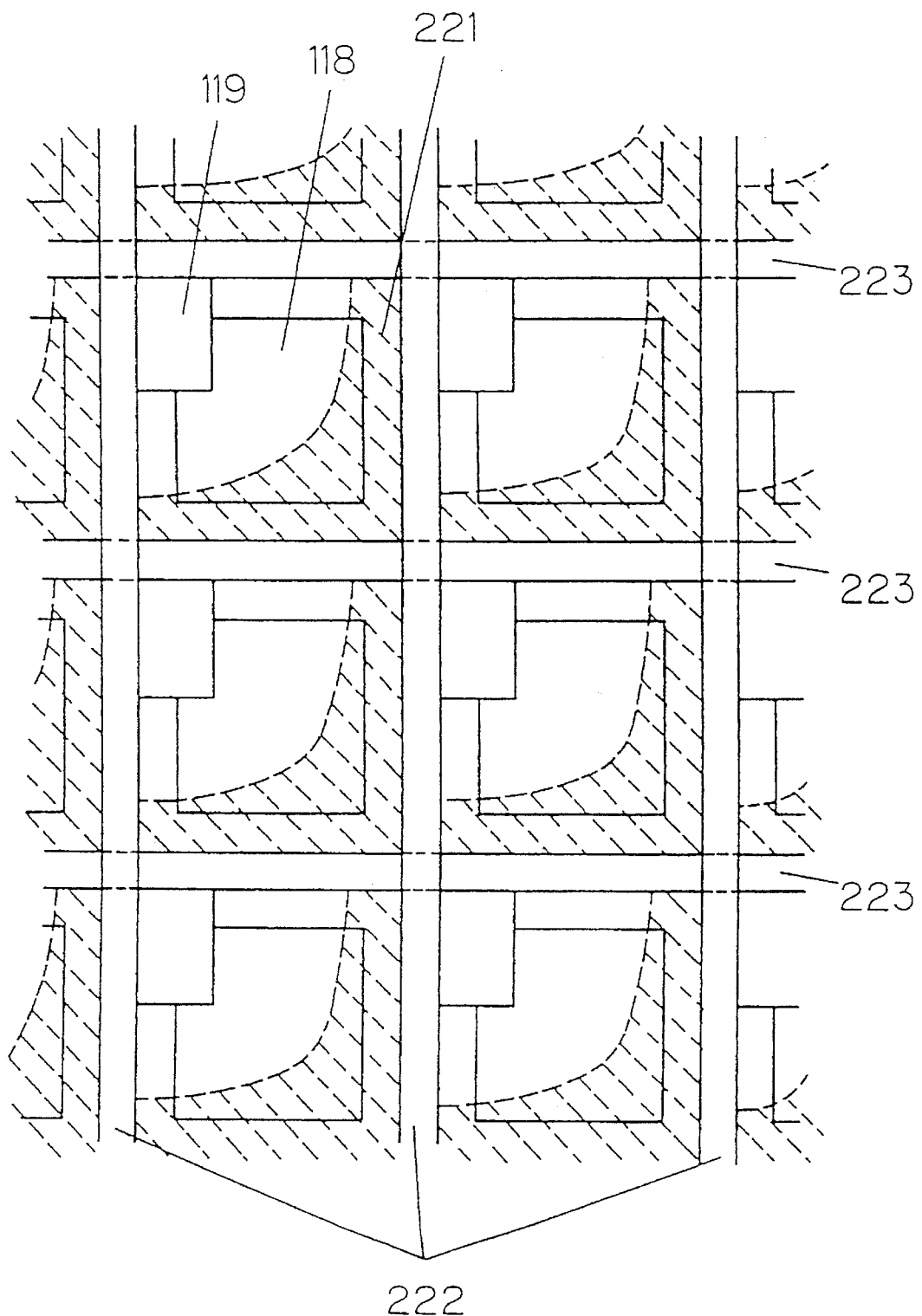
FIG. 14 is a schematic block diagram for illustrating the abnormal orientation of the liquid crystal displaying apparatus.

An NW mode TN liquid crystal panel becomes generally uneven in picture quality of the display image because of different visual field angle characteristics of the display image in the rubbing direction. As the inequality of the picture quality is hardly conspicuous if the visual field angle characteristic is symmetrical with respect to right and left sides, the rubbing direction is often made ±45° with respect to the picture face vertical direction. In this case, there is a problem in that abnormal orientation is caused. The abnormal orientation is a phenomenon where the liquid crystal molecules are not normally oriented in the case of the black display and are caused for each picture element as shown with oblique line of FIG. 14. In an area 221 where abnormal orientation is caused, the light is transmitted. The abnormal orientation is likely to be caused most when the rubbing direction of the orientation film is ±45° with respect to the picture face vertical direction, and the abnormal orientation causes a reduction in the contrast. As the picture element density becomes higher, the stage difference on the substrate face of TFT or the like is influenced. The ratio of the abnormal orientation area 221 becomes larger. Although the reduction in the contrast can be prevented if the width of the black matrix is made thicker, the aperture index of the picture element is lowered, thereby causing a problem in reducing the transmission index.

In order to restrain the abnormal orientation, one substrate of the liquid crystal cell can be rubbed in the direction of the source signal wire 222, namely, in the vertical direction of the picture face. Alternatively, the other substrate can be rubbed in the direction of the gate signal wire, namely, in the horizontal direction of the picture face. In this case, the visual field angle characteristics become symmetrical within the flat face including the direction of 45° with respect to the vertical direction of the picture face and the normal of the substrate, and become non-symmetrical within the flat face orthogonal to it. Within the non-symmetrical flat face in the visual field angle characteristics, the relation between the transmission index and the incident angle in the black display becomes the same as shown in FIG. 5. In the projection displaying apparatus where the major light rays are adapted to become incident perpendicularly to the picture face center of the liquid crystal cell with the use of the conventional NW mode TN liquid crystal panel, the picture quality of the projection image does not become symmetrical with respect to right and left sides, but becomes symmetrical in a diagonal direction so that the inequality of the picture quality is likely to become conspicuous.

As the optimum incident angle can be made 0° by the rotation of the phase difference plate in the liquid crystal displaying apparatus of the present invention, projection images superior in picture quality and higher in contrast can be obtained if the projection lens is telocentric. As the abnormal orientation area 221 is reduced by, for example, approximately 20% by the rubbing operation in the picture vertical direction and the picture face horizontal direction, the width of the black matrix can be made narrower so that the aperture index is improved and the display brilliance is increased.

Figure 15:
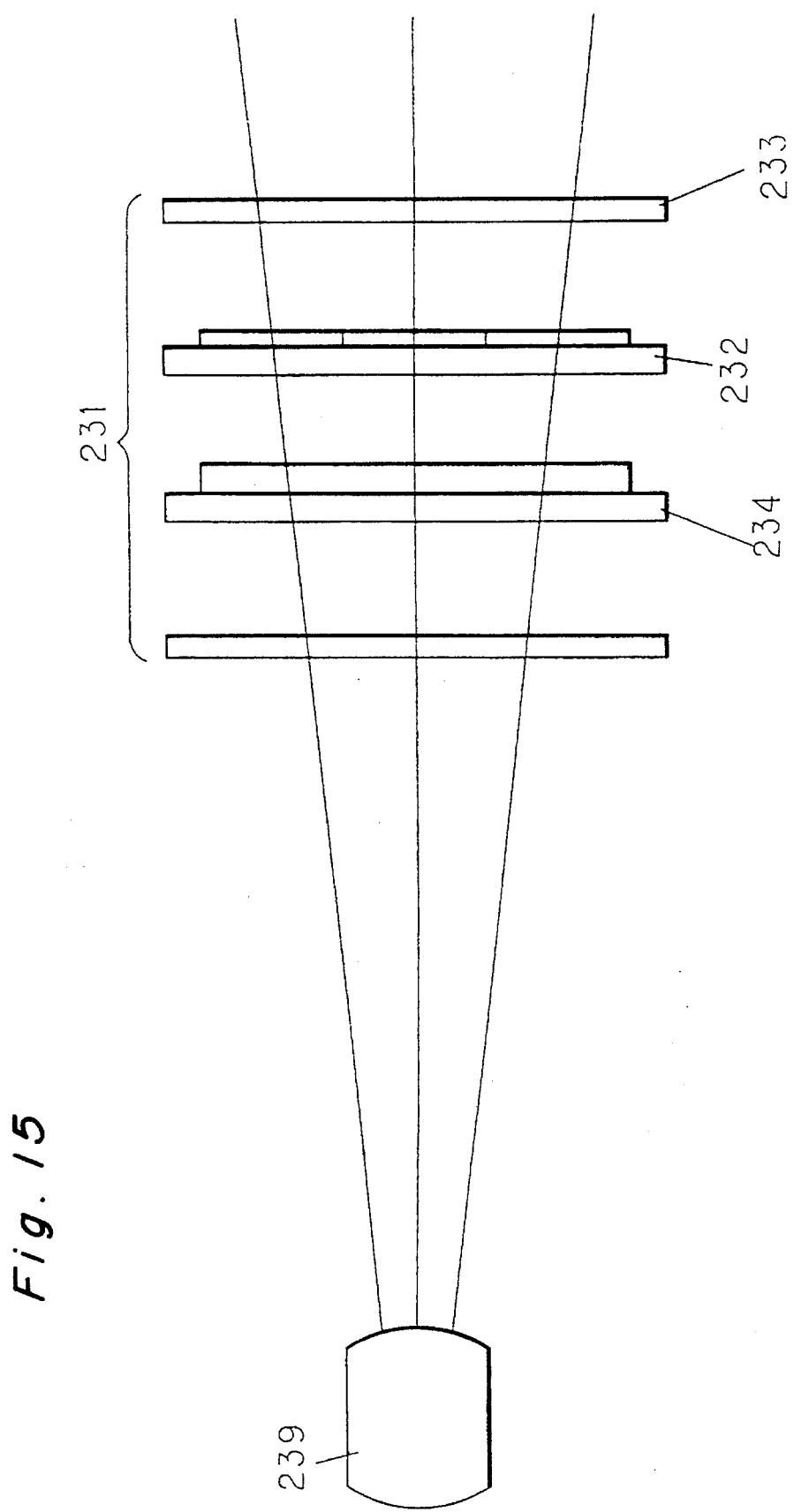
FIG. 15 is a schematic construction view showing the construction of a fourth embodiment of a projection displaying apparatus of the present invention.

FIG. 15 shows the construction of a fourth embodiment of the projection displaying apparatus of the present invention. Reference numeral 231 is a liquid crystal displaying apparatus, reference numeral 232 is a phase difference plate and reference numeral 239 is a projection lens.

Figure 16:
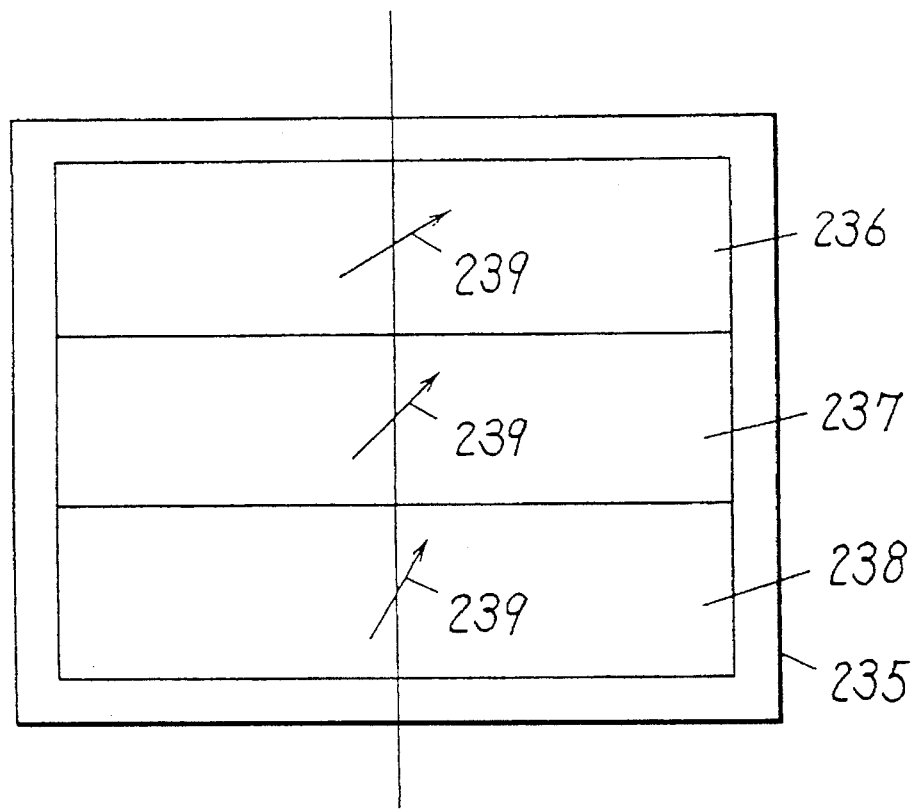
FIG. 16 is a plan view showing the construction of a phase difference plate to be used for a projection displaying apparatus shown in FIG. 13.

In the liquid crystal displaying apparatus 231, the phase difference plate 232 is disposed between a polarizing plate 233 on the incident side and the liquid crystal cell 234 as shown in FIG. 8. The phase difference plate 232 is constructed as shown in FIG. 16. The effective area on the glass substrate 235 is divided into three areas. Phase difference films 236, 237 and 238 are pasted respectively on the first area, the second area and the third area.

When the projection lens 239 is not telocentric, the incident direction of the major light rays incident into the liquid crystal cell become different as shown in FIG. 15. The major light rays are incident from the oblique upper portion of the liquid crystal cell 234. The major light rays are incident from the oblique lower portion of the liquid crystal cell 234. The three phase difference films 236, 237 and 238 are different respectively in the size of retardation or in the direction of the lagging axis. The direction of the advancing axis 239 is selected so that the incident angle of the major light rays incident into the centers of the respective phase difference films 236, 237 and 238 may become respectively optimum incident angles. The phase difference plate 232 is disposed away from the liquid crystal cell 234 so that the end portions of the phase difference films 236, 237 and 238 may not become conspicuous on the projection image. As the incident angle in each area becomes closer to the optimum incident angle by the use of such phase difference plate 232, the whole projection image can be made higher in contrast. The liquid crystal displaying apparatus and the projection displaying apparatus of the present invention can be applied even when the projection lens is not telocentric.

When the projection displaying apparatus is made, a value to be determined from the way the projection displaying apparatus will be used is different from a value (optimum incident angle) to be determined from the characteristics of the liquid crystal cell about the incident angle in the picture center of the picture crystal cell.

In such a case, a phase difference plate small in retardation is used as in the present invention so as to change the azimuth of the lagging axis of the phase difference plate or the advancing axis thereof. The contrast of the projection image can be optimized with respect to the incident angle depending on the design. Even when the dispersion of the optimum incident angle is in the individual liquid crystal cell, the dispersion can be compensated for by use of the present invention.

Figure 17:
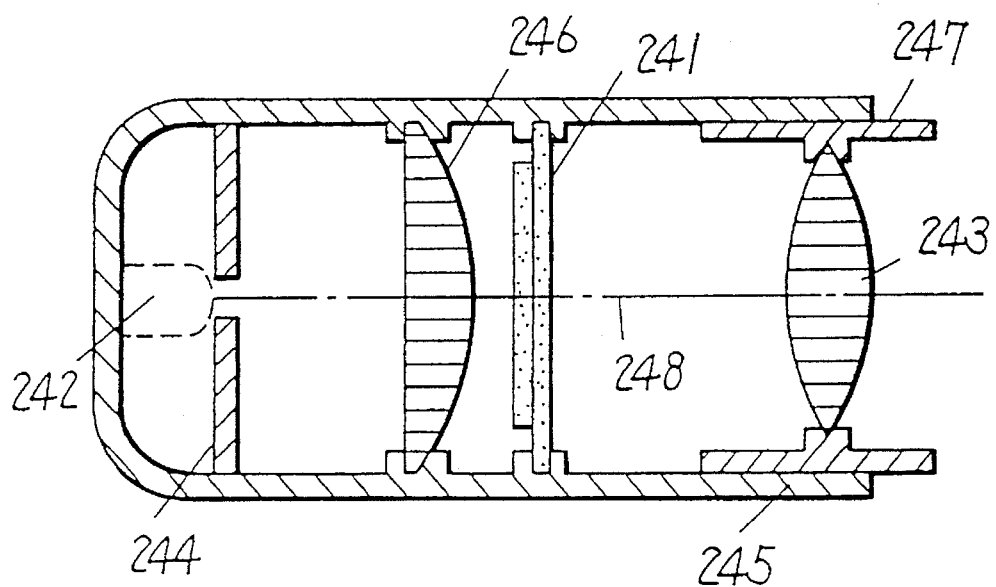
FIG. 17 is a schematic construction view showing the construction of a view finder apparatus of the present invention.
Figure 18:
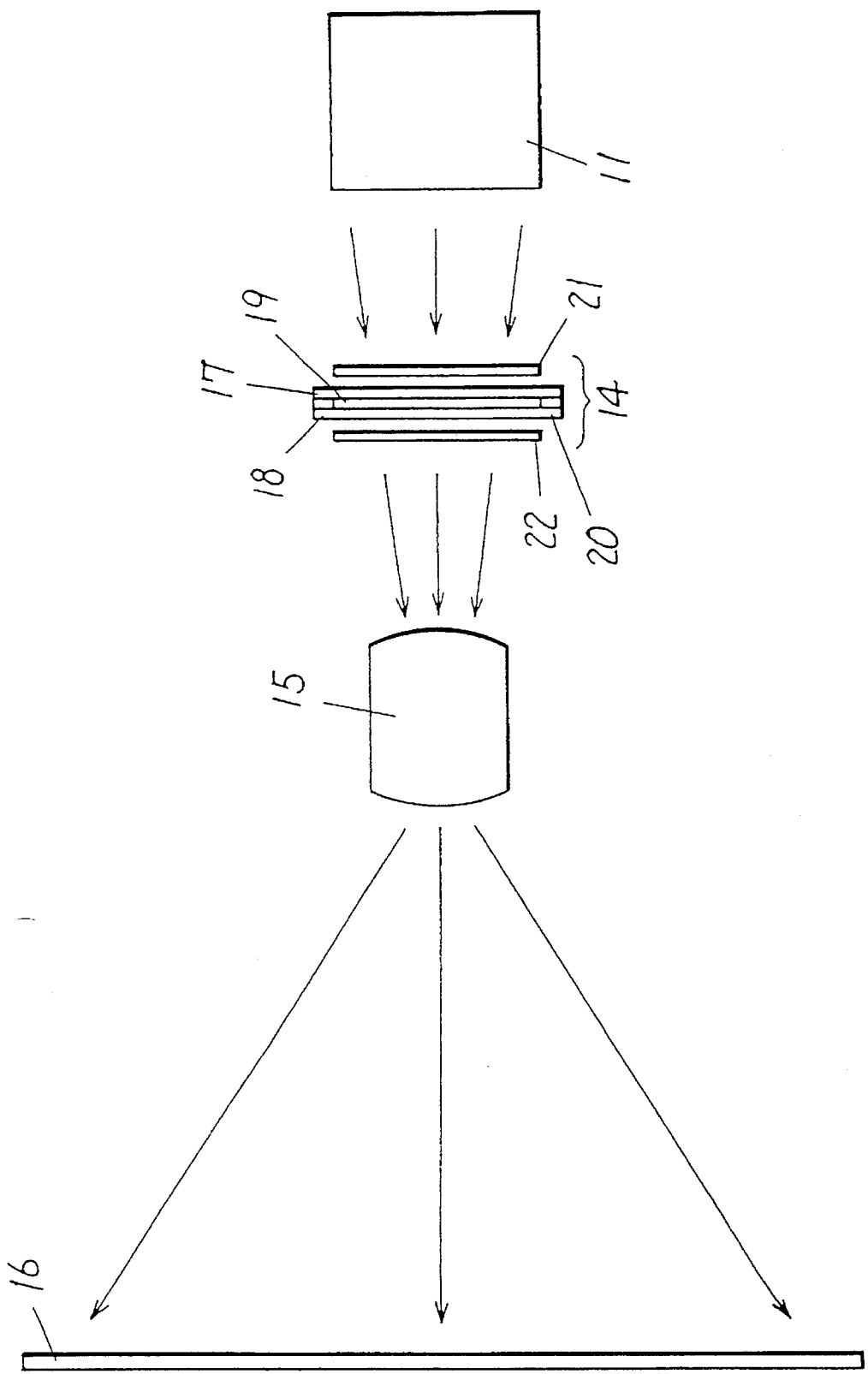
FIG. 18 is a schematic construction view showing the construction of a conventional projection displaying apparatus.
Figure 19:
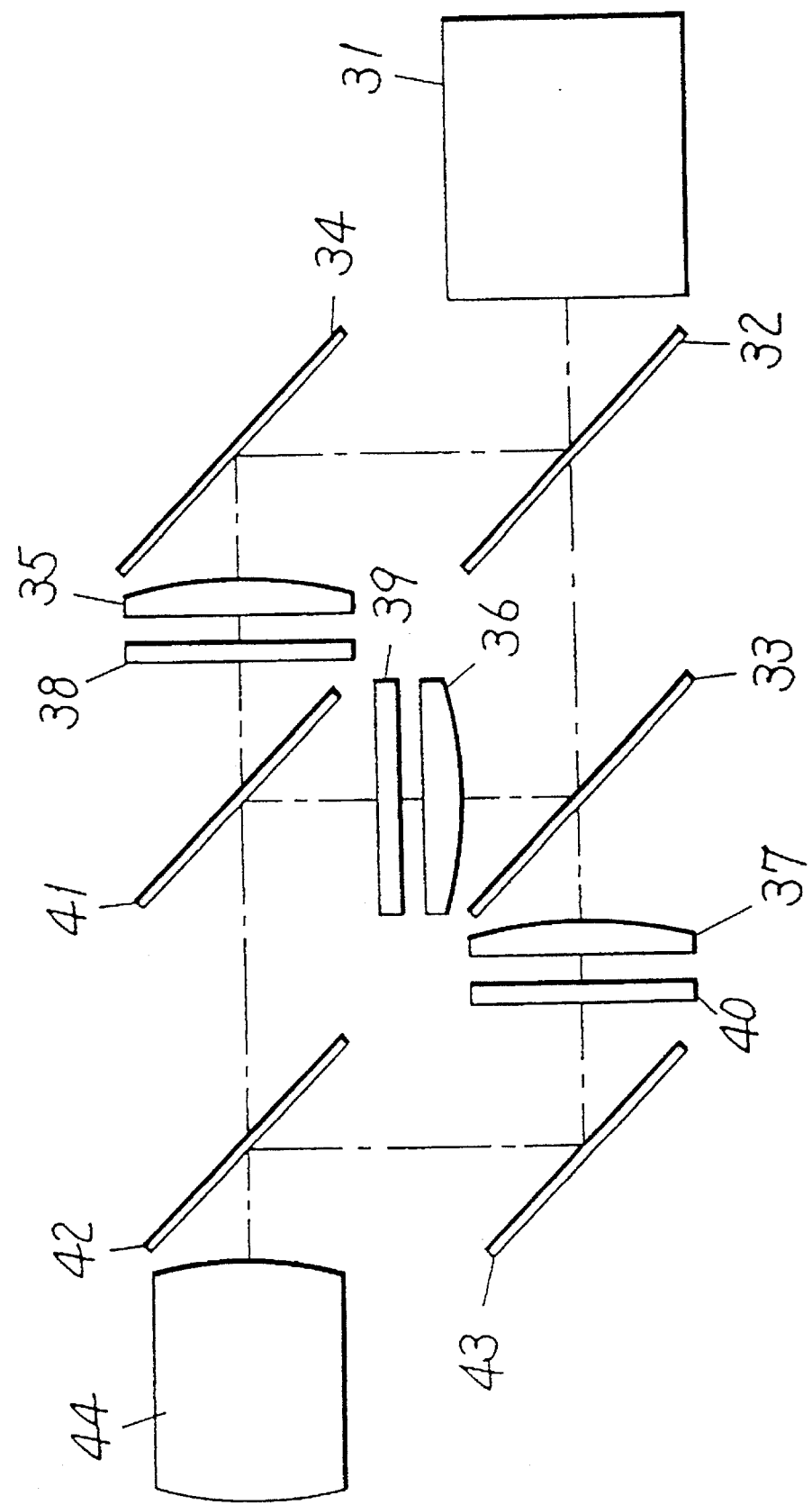
FIG. 19 is a schematic construction view showing the construction of a conventional projection displaying apparatus.
Figure 20:
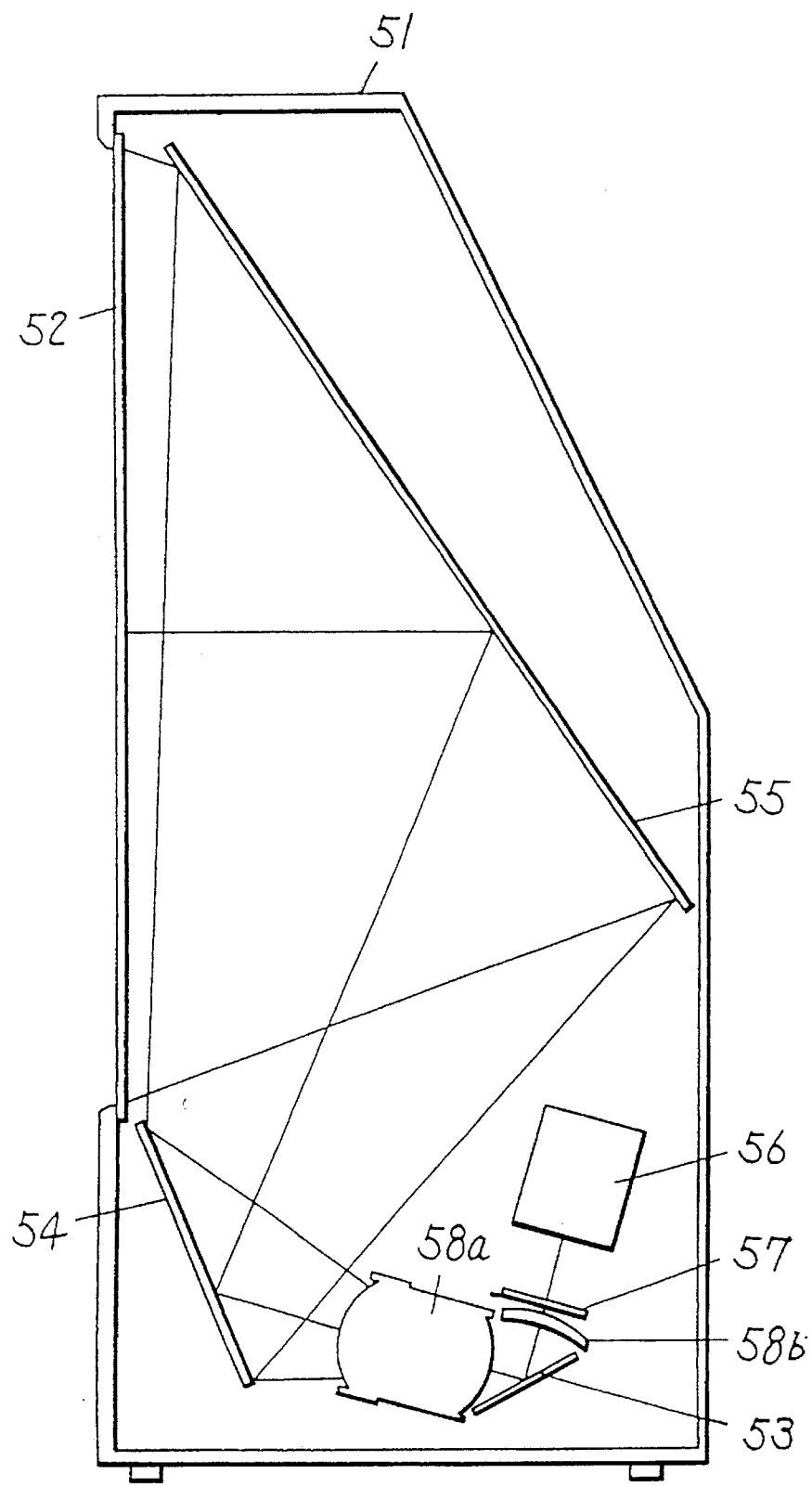
FIG. 20 is a schematic construction view showing the construction of the conventional projection displaying apparatus.
Figure 21:
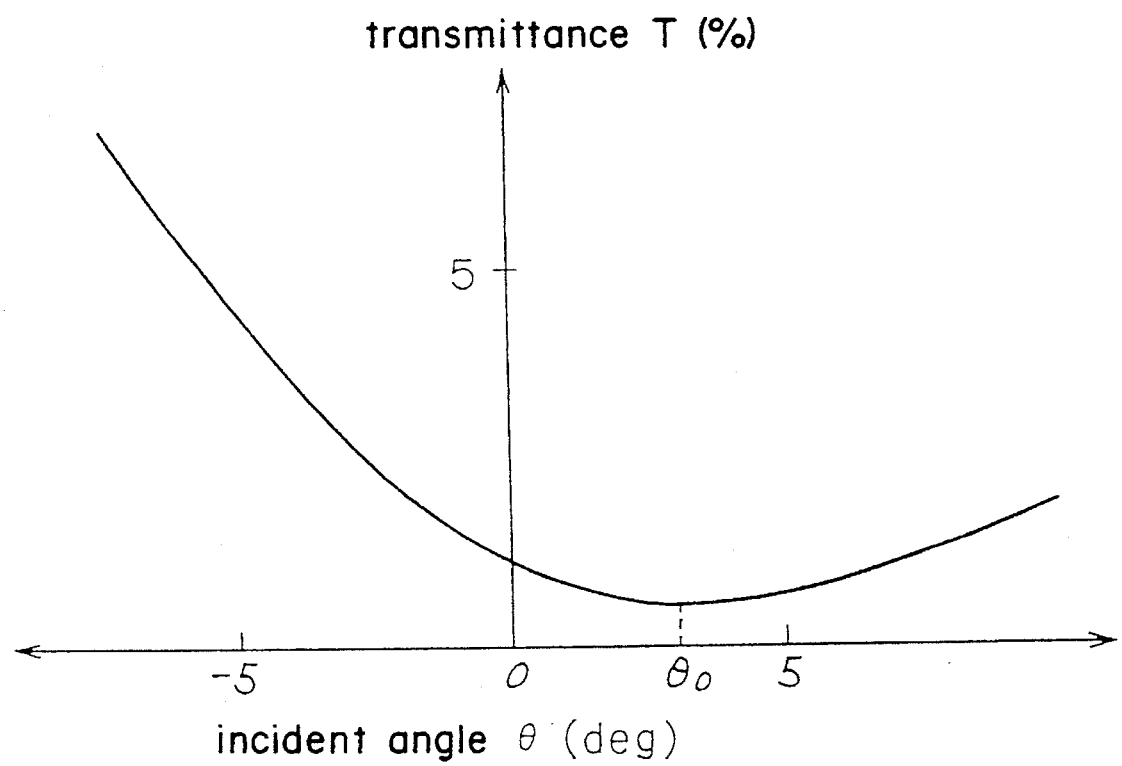
FIG. 21 is a characteristic graph showing the relation between the transmission index and the incident angle of the conventional liquid crystal displaying apparatus.
Figure 22:
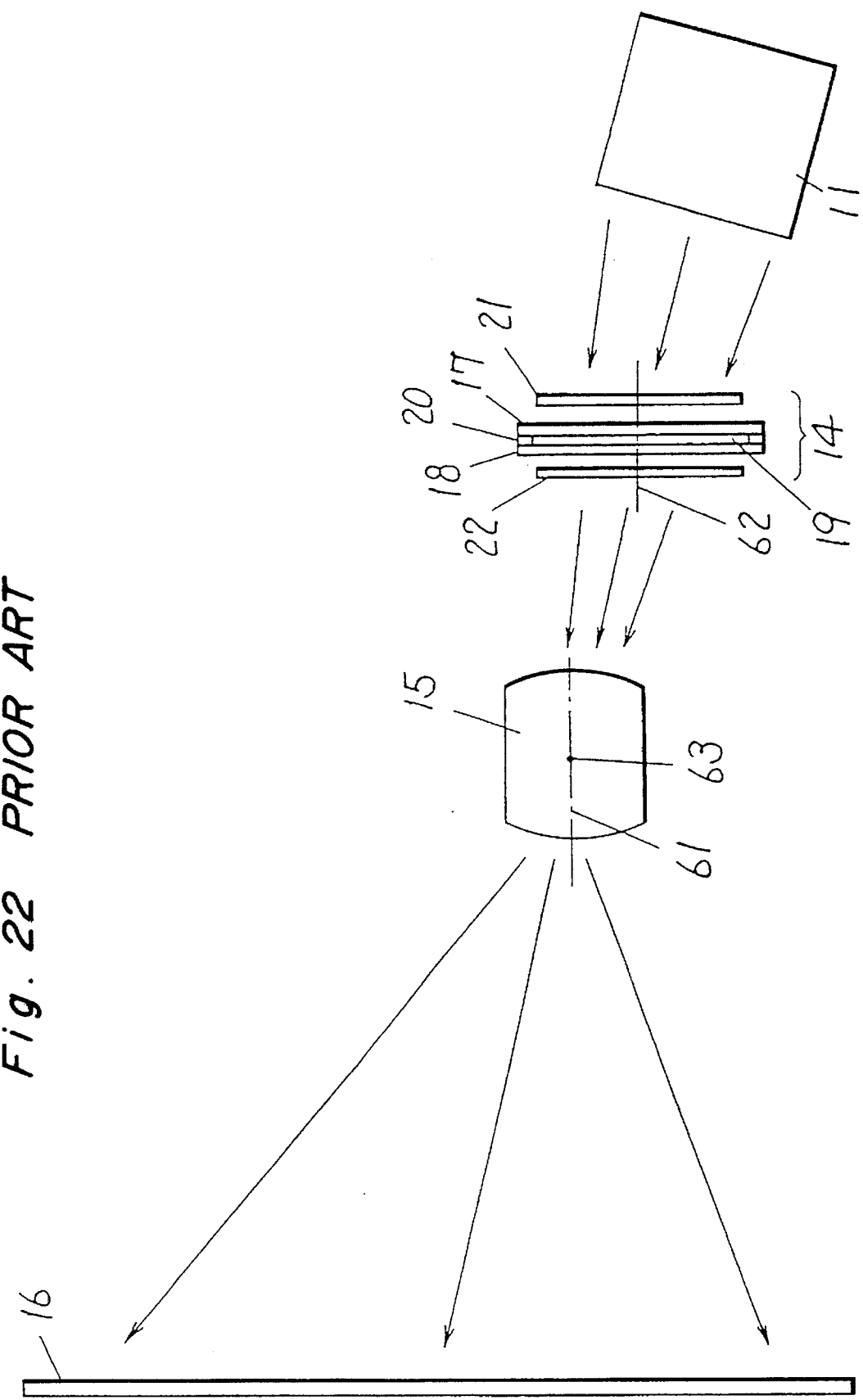
FIG. 22 is a schematic construction view showing the construction of the conventional projection displaying apparatus.

An embodiment of a view finder apparatus of the present invention will be described. FIG. 17 shows the construction of the embodiment. Reference numeral 241 is a liquid crystal displaying apparatus, reference numeral 242 is a light source and reference numeral 243 is an eye lens.

The liquid crystal displaying apparatus 241 has color filters inside in a construction similar to the liquid crystal displaying apparatus shown in FIG. 3. Light to be outputted from the light source 242 is irradiated through a small hole of an aperture 244. The light is converted into parallel light narrower in directivity by a focusing lens 246, is transmitted through the liquid crystal displaying apparatus 241 and the eye lens 243 and is inputted into the eyes of the user. The light axis 248 of the eye lens 243 passes through the picture face center of the liquid crystal displaying apparatus 241 and becomes perpendicular to the liquid crystal layer. The eye lens 243 is engaged in the holder 247. An optical image is formed on the liquid crystal displaying apparatus 241 as changes in the optical transmission index in accordance with the image signal. The optical image looks enlarged when a user looks through the eye lens 243. Adjustment is effected by changes in the insertion degree of the holder 247 engaged in the body 245 of the view finder.

The liquid crystal displaying apparatus, the projection displaying apparatus and the view finder apparatus of the present invention are adapted to convert the elliptically polarized light to be outputted from the liquid crystal cell, when the given driving voltage for black displaying operation has been applied into the liquid cell, into a linearly polarized light by the phase difference means small in retardation, so that a display image of high contrast can be obtained. As the compensation of the dispersion in the optical characteristics of individual liquid crystal cells and the control of the optical incident angle of the liquid crystal displaying apparatus can be effected by the rotating adjustment of the phase difference means, much larger effects are provided.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as included therein.

What is claimed is:

1. A liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate;

wherein the input side polarization plate and the output side polarization plate are arranged in such a way that said liquid crystal display apparatus is of a NW mode;

wherein the polarizing axis of the input side polarization plate is parallel or perpendicular to the molecular long axis of a liquid crystal molecule in contact with the input side transparent substrate;

wherein the phase difference element has a retardation smaller than 50 nm and larger than a phase difference of the liquid crystal cell when the liquid crystal cell has a voltage of a given size applied thereto to provide a black display; and wherein the direction of the phase advancing axis of the phase difference element relative to the polarization axis of the input side polarization plate is defined by an angle $\alpha$ which satisfies the following equation $$Q = \sin 2\alpha \sin \delta / (1 + (1 - \sin^2 \alpha \sin^2 \delta)^{1/2}),$$

where $Q$=elliptical index of the liquid crystal cell; and $\delta$=a phase difference of the phase difference element.

2. A liquid crystal display apparatus according to claim 1, wherein the liquid crystal molecule in contact with the input side pixel electrode has its molecular axis aligned in a direction parallel to a display face or in a direction perpendicular to the display face.

3. A liquid crystal display apparatus according to claim 1, wherein the phase difference element is separated from the liquid crystal cell, the input side polarization plate and the output side polarization plate; and the phase advancing axis of the phase difference element is variable in direction.

4. A liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element and a transparent body disposed between the input side polarization plate and the output side polarization plate; and wherein the phase difference element comprises a transparent resin film and is optically connected, through said transparent body, to the one of said input and output side polarization plates and the one of said input and output side transparent substrates disposed on the same side of said liquid crystal cell as said phase difference element.

5. A liquid crystal display apparatus according to claim 4, wherein the transparent body comprises an elastic material, and the phase difference element is rotatable within a given angular range relative to a device connected to the transparent body.

6. A liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and retardation at a given wave length is different for each area.

7. A liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and a direction of a phase advancing axis is different for each area.

8. A liquid crystal display projection apparatus comprising a light source, a liquid crystal display apparatus for forming an optical image in response to a video signal upon receiving an output light from the light source, and a projection lens for projecting the optical image on a screen upon receiving an output light from the liquid crystal display apparatus, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate;

wherein the input side polarization plate and the output side polarization plate are arranged in such a way that said liquid crystal display apparatus is of a NW mode;

wherein the polarizing axis of the input side polarization plate is parallel or perpendicular to the molecular long axis of a liquid crystal molecule in contact with the input side transparent substrate;

wherein the phase difference element has a retardation smaller than 50 nm and larger than a phase difference of the liquid crystal cell when the liquid crystal cell has a voltage of a given size applied thereto to provide a black display; and wherein the direction of the phase advancing axis of the phase difference element relative to the polarization axis of the input side polarization plate is defined by an angle α which satisfies the following equation $Q = \sin 2\alpha \sin \delta / (1 + (1 - \sin^2 \alpha \sin^2 \delta)^{1/2})$, where Q=elliptical index of the liquid crystal cell; and δ=a phase difference of the phase difference element.

9. A liquid crystal display projection apparatus according to claim 8, wherein the projection lens receives rays of main light emitted from various pixels of the liquid crystal display apparatus, said rays of main light being nearly parallel to each other.

10. A liquid crystal display projection apparatus according to claim 8, wherein the liquid crystal molecule in contact with the input side pixel electrode has its molecular axis aligned in a direction parallel to a display face or in a direction perpendicular to the display face.

11. A liquid crystal display projection apparatus according to claim 8, wherein said liquid crystal display apparatus is perpendicular relative to the light axis of the light source and the projection lens.

12. A liquid crystal display projection apparatus according to claim 8, wherein the phase difference element is separated from the liquid crystal cell, the input side polarization plate and the output side polarization plate; and the phase advancing axis of the phase difference element is variable in direction.

13. A liquid crystal display projection apparatus comprising a light source, a liquid crystal display apparatus for forming an optical image in response to a video signal upon receiving an output light from the light source, and a projection lens for projecting the optical image on a screen upon receiving an output light from the liquid crystal display apparatus, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element and a transparent body disposed between the input side polarization plate and the output side polarization plate; and wherein the phase difference element is optically connected, through the transparent body, to the one of said input and output side polarization plates and the one of said input and output side transparent substrates disposed on the same side of said liquid crystal cell as said phase difference element.

14. A liquid crystal display projection apparatus according to claim 13, wherein the transparent body comprises an elastic material, and the phase difference element is rotatable within a given angular range relative to a device connected to the transparent body.

15. A liquid crystal display projection apparatus comprising a light source, a liquid crystal display apparatus for forming an optical image in response to a video signal upon receiving an output light from the light source, and a projection lens for projecting the optical image on a screen upon receiving an output light from the liquid crystal display apparatus, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element and a transparent body disposed between the input side polarization plate and the output side polarization plate; and wherein said phase difference element is divided into a plurality of areas, and retardation at a given wave length is different for each area.

16. A liquid crystal display projection apparatus comprising a light source, a liquid crystal display apparatus for forming an optical image in response to a video signal upon receiving an output light from the light source, and a projection lens for projecting the optical image on a screen upon receiving an output light from the liquid crystal display apparatus, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element and a transparent body disposed between the input side polarization plate and the output side polarization plate; and wherein said phase difference element is divided into a plurality of areas, and a direction of a phase advancing axis is different for each area.

17. A liquid crystal display projection apparatus comprising a light source for emitting light including color components of three principal colors, color decomposition means for decomposing the emitted light from the light source into lights of the three principal colors, three liquid crystal display apparatuses for respectively receiving the lights of the three principal colors from the color decomposition means, and for forming an optical image in response to a video signal, light synthesizing means for synthesizing light emitted from the three liquid crystal display apparatuses, a projection lens for receiving light emitted from the light synthesizing means and projecting the optical image on a screen, wherein each of said three liquid crystal display apparatuses comprises:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate;

wherein the input side polarization plate and the output side polarization plate are arranged in such a way that said liquid crystal display apparatus is of a NW mode;

wherein the polarizing axis of the input side polarization plate is parallel or perpendicular to the molecular long axis of a liquid crystal molecule in contact with the input side transparent substrate;

wherein the phase difference element has a retardation smaller than 50 nm and larger than a phase difference of the liquid crystal cell when the liquid crystal cell has a voltage of a given size applied thereto to provide a black display; and wherein the direction of the phase advancing axis of the phase difference element relative to the polarization axis of the input side polarization plate is defined by an angle $\alpha$ which satisfies the following equation $$Q = \sin 2\alpha \sin \delta/(1+(1-\sin^2 \alpha \sin^2 \delta)^{1/2}),$$

where $Q$=elliptical index of the liquid crystal cell; and $\delta$=a phase difference of the phase difference element.

18. A liquid crystal display projection apparatus according to claim 17, wherein the projection lens receives rays of main light emitted from various pixels of the liquid crystal display apparatus, said rays of main light being nearly parallel to each other.

19. A liquid crystal display projection apparatus according to claim 17, wherein the liquid crystal molecule in contact with the input side pixel electrode has its molecular axis aligned in a direction parallel to a display face or in a direction perpendicular to the display face.

20. A liquid crystal display projection apparatus according to claim 17, wherein said liquid crystal display apparatus is perpendicular relative to the light axis of the light source and the projection lens.

21. A liquid crystal display projection apparatus according to claim 17, wherein the phase difference element is separated from the liquid crystal cell, the input side polarization plate and the output side polarization plate; and the phase advancing axis of the phase difference element is variable in direction.

22. A liquid crystal display projection apparatus comprising a light source for emitting light including color components of three principal colors, color decomposition means for decomposing the emitted light from the light source into lights of the three principal colors, three liquid crystal display apparatuses for respectively receiving the lights of the three principal colors from the color decomposition means, and for forming an optical image in response to a video signal, light synthesizing means for synthesizing light emitted from the three liquid crystal display apparatuses, a projection lens for receiving light emitted from the light synthesizing means and projecting the optical image on a screen, wherein each of said three liquid crystal display apparatuses comprises:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element and a transparent body disposed between the input side polarization plate and the output side polarization plate; and wherein the phase difference element is optically connected, through the transparent body, to the one of said input and output side polarization plates and the one of said input and output side transparent substrates disposed on the same side of said liquid crystal cell as said phase difference element.

23. A liquid crystal display projection apparatus according to claim 22, wherein the transparent body comprises an elastic material, and the phase difference element is rotatable within a given angular range relative to a device connected to the transparent body.

24. A liquid crystal display projection apparatus comprising a light source for emitting light including color components of three principal colors, color decomposition means for decomposing the emitted light from the light source into lights of the three principal colors, three liquid crystal display apparatuses for respectively receiving the lights of the three principal colors from the color decomposition means, and for forming an optical image in response to a video signal, light synthesizing means for synthesizing light emitted from the three liquid crystal display apparatuses, a projection lens for receiving light emitted from the light synthesizing means and projecting the optical image on a screen, wherein each of said three liquid crystal display apparatuses comprises:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and retardation at a given wave length is different for each area.

25. A liquid crystal display projection apparatus comprising a light source for emitting light including color components of three principal colors, color decomposition means for decomposing the emitted light from the light source into lights of the three principal colors, three liquid crystal display apparatuses for respectively receiving the lights of the three principal colors from the color decomposition means, and for forming an optical image in response to a video signal, light synthesizing means for synthesizing light emitted from the three liquid crystal display apparatuses, a projection lens for receiving light emitted from the light synthesizing means and projecting the optical image on a screen, wherein each of said three liquid crystal display apparatuses comprises:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and a direction of a phase advancing axis is different for each area.

26. A liquid crystal display projection apparatus comprising a cabinet, a transmission screen arranged at a front of the cabinet, a light source, a liquid crystal display apparatus for forming an optical image in response to a video signal upon receiving an output light from the light source, and a projection lens for projecting the optical image on the screen upon receiving an output light from the liquid crystal display apparatus, said light source, said liquid crystal display apparatus, and said projection lens being accommodated in said cabinet, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate;

wherein the input side polarization plate and the output side polarization plate are arranged in such a way that said liquid crystal display apparatus is of a NW mode;

wherein the polarizing axis of the input side polarization plate is parallel or perpendicular to the molecular long axis of a liquid crystal molecule in contact with the input side transparent substrate;

wherein the phase difference element has a retardation smaller than 50 nm and larger than a phase difference of the liquid crystal cell when the liquid crystal cell has a voltage of a given size applied thereto to provide a black display; and wherein the direction of the phase advancing axis of the phase difference element relative to the polarization axis of the input side polarization plate is defined by an angle α which satisfies the following equation $$Q=\sin 2\alpha \sin \delta/(1+(1-\sin^2 \alpha \sin^2 \delta)^{1/2}),$$

where

Q=elliptical index of the liquid crystal cell; and δ=a phase difference of the phase difference element.

27. A liquid crystal display projection apparatus according to claim 26, wherein the projection lens receives rays of main light emitted from various pixels of the liquid crystal display apparatus, said rays of main light being nearly parallel to each other.

28. A liquid crystal display projection apparatus according to claim 26, wherein the liquid crystal molecule in contact with the input side pixel electrode has its molecular axis aligned in a direction parallel to a display face or in a direction perpendicular to the display face.

29. A liquid crystal display projection apparatus according to claim 26, wherein said liquid crystal display apparatus is perpendicular relative to the light axis of the light source and the projection lens.

30. A liquid crystal display projection apparatus according to claim 26, wherein the phase difference element is separated from the liquid crystal cell, the input side polarization plate and the output side polarization plate; and the phase advancing axis of the phase difference element is variable in direction.

31. A liquid crystal display projection apparatus comprising a cabinet, a transmission screen arranged at a front of the cabinet, a light source, a liquid crystal display apparatus for forming an optical image in response to a video signal upon receiving an output light from the light source, and a projection lens for projecting the optical image on the screen upon receiving an output light from the liquid crystal display apparatus, said light source, said liquid crystal display apparatus, and said projection lens being accommodated in said cabinet, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element and a transparent body disposed between the input side polarization plate and the output side polarization plate; and wherein the phase difference element is optically connected, through the transparent body, to the one of said input and output side polarization plates and the one of said input and output side transparent substrates disposed on the same side of said liquid crystal cell as said phase difference element.

32. A liquid crystal display projection apparatus according to claim 31, wherein the transparent body comprises an elastic material, and the phase difference element is rotatable within a given angular range relative to a device connected to the transparent body.

33. A liquid crystal display projection apparatus comprising a cabinet, a transmission screen arranged at a front of the cabinet, a light source, a liquid crystal display apparatus for forming an optical image in response to a video signal upon receiving an output light from the light source, and a projection lens for projecting the optical image on the screen upon receiving an output light from the liquid crystal display apparatus, said light source, said liquid crystal display apparatus, and said projection lens being accommodated in said cabinet, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and retardation at a given wave length is different for each area.

34. A liquid crystal display projection apparatus comprising a cabinet, a transmission screen arranged at a front of the cabinet, a light source, a liquid crystal display apparatus for forming an optical image in response to a video signal upon receiving an output light from the light source, and a projection lens for projecting the optical image on the screen upon receiving an output light from the liquid crystal display apparatus, said light source, said liquid crystal display apparatus, and said projection lens being accommodated in said cabinet, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and a direction of a phase advancing axis is different for each area.

35. A liquid crystal display view finder apparatus comprising a light source, a condenser lens for leading emitted light from the light source, a liquid crystal display apparatus for forming an optical image in response to a video signal, and an eyepiece for receiving light emitted from the liquid crystal display apparatus and for converting the optical image into an enlarged virtual image, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate;

wherein the polarizing axis of the input side polarization plate is parallel or perpendicular to the molecular long axis of a liquid crystal molecule in contact with the input side transparent substrate; and wherein a direction of a phase advancing axis of the phase difference element relative to the polarizing axis of the input side polarization plate is such that the phase difference element minimizes the transmissivity of an optical system defined from the input side polarization plate to the output side polarization plate when the liquid crystal cell has a given voltage applied thereto and receives the light from a given direction.

36. A view finder according to claim 35, wherein an aperture is disposed between the light source and the condenser lens.

37. A liquid crystal display view finder apparatus comprising a light source, a liquid crystal display apparatus for forming an optical image in response to a video signal, and an eyepiece for receiving light emitted from the liquid crystal display apparatus and for converting the optical image into an enlarged virtual image, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate;

wherein the input side polarization plate and the output side polarization plate are arranged in such a way that said liquid crystal display apparatus is of a NW mode;

wherein the polarizing axis of the input side polarization plate is parallel or perpendicular to the molecular long axis of a liquid crystal molecule in contact with the input side transparent substrate;

wherein the phase difference element has a retardation smaller than 50 nm and larger than a phase difference of the liquid crystal cell when the liquid crystal cell has a voltage of a given size applied thereto to provide a black display; and wherein the direction of the phase advancing axis of the phase difference element relative to the polarization axis of the input side polarization plate is defined by an angle α which satisfies the following equation $$Q = \sin 2\alpha \sin \delta / (1 + (1 - \sin^2 \alpha \sin^2 \delta)^{1/2}),$$

where

Q=elliptical index of the liquid crystal cell; and δ=a phase difference of the phase difference element.

38. A liquid crystal display view finder apparatus according to claim 37, wherein the liquid crystal molecule in contact with the input side pixel electrode has its molecular axis aligned in a direction parallel to a display face or in a direction perpendicular to the display face.

39. A liquid crystal display view finder apparatus according to claim 37, said liquid crystal display apparatus is perpendicular relative to the light axis of the light source and the projection lens.

40. A liquid crystal display view finder apparatus according to claim 37, wherein the phase difference element is separated from the liquid crystal cell, the input side polarization plate and the output side polarization plate; and the phase advancing axis of the phase difference element is variable in direction.

41. A liquid crystal display view finder apparatus comprising a light source, a liquid crystal display apparatus for forming an optical image in response to a video signal, and an eyepiece for receiving light emitted from the liquid crystal display apparatus and for converting the optical image into an enlarged virtual image, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element and a transparent body disposed between the input side polarization plate and the output side polarization plate; and wherein the phase difference element is optically connected, through the transparent body, to the one of said input and output side polarization plates and the one of said input and output side transparent substrates disposed on the same side of said liquid crystal cell as said phase difference element.

42. A liquid crystal display view finder apparatus according to claim 41, wherein the transparent body comprises an elastic material and the phase difference element is rotatable within a given angular range relative to a device connected to the transparent body.

43. A liquid crystal display view finder apparatus comprising a light source, a liquid crystal display apparatus for forming an optical image in response to a video signal, and an eyepiece for receiving light emitted from the liquid crystal display apparatus and for converting the optical image into an enlarged virtual image, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and retardation at a given wave length is different for each area.

44. A liquid crystal display view finder apparatus comprising a light source, a liquid crystal display apparatus for forming an optical image in response to a video signal, and an eyepiece for receiving light emitted from the liquid crystal display apparatus and for converting the optical image into an enlarged virtual image, said liquid crystal display apparatus comprising:

an input side transparent substrate having an input side pixel electrode formed thereon;

an output side transparent substrate having an output side pixel electrode formed thereon;

a liquid crystal cell disposed between the input side and output side transparent substrates and having twist nematic liquid crystal of a twist angle of 90° inserted therein;

an input side polarization plate attached to an input side of the liquid crystal cell;

an output side polarization plate attached to an output side of the liquid crystal cell; and a phase difference element disposed between the input side polarization plate and the output side polarization plate; and wherein said phase difference element is divided into a plurality of areas, and a direction of a phase advancing axis is different for each area.

* * * * *